United States Patent [19]
Abe et al.

[11] Patent Number: 6,084,843
[45] Date of Patent: Jul. 4, 2000

[54] OPTICAL RECORDING AND REPRODUCING APPARATUS AND METHOD

[75] Inventors: Tsuguhiro Abe, Tokyo; Junichi Suzuki; Satoshi Hineno, both of Kanagawa; Kimihiro Saito, Saitama, all of Japan

[73] Assignee: Sony Corporation, Tokyo, Japan

[21] Appl. No.: 09/039,479

[22] Filed: Mar. 16, 1998

[30]     Foreign Application Priority Data

Mar. 19, 1997  [JP]  Japan ............................... PO9-065850

[51] Int. Cl.⁷ ....................................................... G11B 7/00
[52] U.S. Cl. ........................ 369/112; 369/109; 369/44.23
[58] Field of Search .................................. 369/112, 110, 369/109, 103, 44.23, 44.24, 94, 58

[56]               References Cited

U.S. PATENT DOCUMENTS

| | | | |
|---|---|---|---|
| 5,446,565 | 8/1995 | Komma et al. . | |
| 5,793,734 | 8/1998 | Tsuchiya et al. | 369/94 |
| 5,870,369 | 2/1999 | Chung et al. | 369/44.24 |
| 5,875,167 | 2/1999 | Katayama | 369/94 |
| 5,912,868 | 6/1999 | Hayashi et al. | 369/94 |
| 5,933,401 | 8/1999 | Lee et al. | 369/94 |
| 5,978,346 | 11/1999 | Mizuno et al. | 369/112 |

FOREIGN PATENT DOCUMENTS 9-306018  11/1997  Japan .
8-121337   5/1998  Japan .

*Primary Examiner*—Nabil Hindi
*Attorney, Agent, or Firm*—Ronald P. Kananen; Rader, Fishman & Grauer

[57]                ABSTRACT

The present invention provides a compact recording and reproducing apparatus capable of playing back DVD and CDs including CD-R. This apparatus comprises a means of focusing a light of a first or second wavelength onto a first or second recording media; a first means disposed off the optical axis of the focusing means to generate a light of the first wavelength; a second means disposed on the optical axis of the focusing means to generate a light of the second wavelength; a means of correcting a coma aberration in the light of the first wavelength and guiding the corrected light along the optical axis of the focusing means, and a means of detecting the light of the first or second wavelength reflected from the first or second recording media.

23 Claims, 32 Drawing Sheets

OPTICAL RECORDING AND REPRODUCING APPARATUS AND METHOD

BACKGROUND OF THE INVENTION

1. Field of the Invention

The present invention relates to an optical recording and reproducing apparatus and method, and more particularly, to an optical recording and reproducing apparatus and method in which in playing different types of recording media to record or reproduce data into or from the media, a light of a first wavelength and a light of a second wavelength are used for one and another, respectively, of the recording media, whereby a compact design of such an apparatus can be attained.

2. Description of Related Art

Storage media, into or from which data is optically written or read, include optical discs such as CD (compact disc; a registered trademark), CD-ROM, CD-R, etc. In addition, other new types of recording media, including a DVD (Digital Versatile disc) capable of storing a large volume of data, have recently been developed and also under development.

To read digital data from a storage media like an optical disc, a laser light is focused on the media, and a reflected part of the laser light from the media is detected and converted to a binary data.

For data write or read into or from such a high-density optical disc, a laser light having a short wavelength ($\lambda$) (for example, $\lambda$=780 nm for playback of a CD and $\lambda$=635 to 650 nm for replaying a DVD on which data are recorded at a higher density) is used and focused to a narrower area on the disc through an objective or an objective lens having a large numerical aperture (NA) (for example, NA=0.45 for playback of a CD and NA=0.6 for replaying a DVD), and a reflected part of the laser light from the disc is detected to reproduce a desired recorded data from the reflected laser light.

If an objective lens having such a large NA is used for the above purpose, a skew of the optical disc will increase an aberration in the reflected light. To reduce such an aberration, DVD substrate is made of a laser light-transmissive material and designed thicker (0.6 mm) than CD substrate (1.2 mm).

The focused spot size varies as a function of the values of an objective lens NA and laser light wavelength $\lambda$, namely, it is proportional to a $\lambda$/NA ratio), and the magnitude of a spherical aberration in a reflected light depends upon the thickness of a substrate used in the disc. Therefore, an optical system capable of reading data from a conventional CD is not compatible with a DVD. On the contrary, an optical system for playback of DVD cannot compatibly be used to read data from CD.

In these situations, however, it is predictably believed that the conventional optical discs such as CD will be coexistent with high-density optical discs such as DVD. For playback of such optical discs, it is extremely inconvenient to use a dedicated player for each of such different types of optical discs.

To avoid the above inconvenience, some methods have been proposed in which a single apparatus is used to play back a plurality of optical discs different in recording density and substrate thickness from each other.

A typical one of such solutions is known from the disclosure in the U.S. Pat. No. 5,446,565 in which an objective lens and a holographic optical element (HOE) is used in combination. FIG. 1 schematically shows the principle of the technology disclosed in the official gazette of the above United States Patent. As shown, a laser light having a wavelength of, for example, 650 nm, is irradiated to a CD 103 or DVD 104 through an HOE 101 and objective lens 102. As will be seen from FIG. 2, the HOE 101 has formed thereon a blazed or four-step hologram consisting of concentric annular zones (wave crests and troughs in sectional form). Because of the hologram made of the annular zones, an incoming light of 650 nm in wavelength is divided into a zero-order diffracted light (transmitted directly through the HOE 101) and a first-order diffracted light as shown in FIG. 3. The zero-order diffracted light is used for CD, while the first-order diffracted light is for DVD. The HOE 101 is optimized to substantially annul the diffracted lights of other orders.

The objective lens 102 is optimized for playback of the DVD 104. Thus, the zero-order diffracted light having passed through the HOE 101 is focused by the objective lens 102 onto a data recording layer of the DVD 104 having a 0.6 mm-thick substrate, as shown in FIG. 1. The pitch of the annular zones on the HOE 101 is optimized so that when the first-order diffracted light is focused through the objective lens 102 onto the CD 103 having a substrate of 1.2 mm in thickness, a spherical aberration due to a difference in thickness from the DVD 104 can be corrected. Also the annular zones have smaller diameters than the effective diameter of the objective lens 102 for an optimum NA for the CD 103. Thus, the first-order diffracted light having passed through the objective lens 102 is focused onto the data recording layer to the limit of diffraction to define a good light spot.

Furthermore, since the annular zone pitch of the HOE 101 is optimized for the light spot on the CD 103 to be a few hundreds microns from the light spot on the DVD 104 along the optical axis, each of the light spots will not affect a reproduced RF signal from the other light spot.

However, as the laser light having a wavelength as short as 650 nm is used in an optical pick-up of the above-mentioned type, data can be reproduced from a normal CD, but not from CD-R. CD-R is designed for both data read and write. Also it is designed to reflect a light having a wavelength falling within a bandwidth of 780 nm, and will thus absorb almost all of a light of 650 nm in wavelength used in the DVD player. This is why the above-mentioned type of optical pick-up cannot reproduce data from CD-R.

For solution of the above problems, the applicant of the present invention proposed an optical pick-up capable of replaying both CDs including CD-R and DVDs, as disclosed in the Japanese Patent Application No. 8-121337. FIGS. 4 and 5 show such pick-up devices, respectively. FIG. 4 shows an optics used in the optical pick-up for playback of the DVD 104, while FIG. 5 shows an optics for playback of the CD 103.

For playback of the DVD 104, a light source 111B generating a laser light of 780 nm in wavelength is turned off while a light source 111A generating a laser light of 650 nm is turned on, as shown in FIG. 4. A laser light emerged from the source 111A is spilt by a grating 112A into substantially three laser lights. These laser lights are passed through a dichroic prism (DP) 113 and polarizing beam splitter (PBS) 114, and incident upon a collimator lens 115. The collimator lens 115 is provided to convert the incident divergent lights to parallel ones which will be incident upon an HOE 117 through a $\lambda$/4 plate 116. After the HOE 117, there is provided a refractive objective lens 118 designed optimal for the DVD 104. Therefore, the HOE 117 is optimized by the refractive objective lens 118 to correct a spherical aberration in a light having a wavelength of 780 nm focused onto the CD 103, and thus it will not substantially work with a light of 650 nm in wavelength.

As shown as enlarged in scale in FIG. 6, the HOE 117 allows almost all the laser light having a wavelength of 650 nm to pass through it. Namely, a zero-order diffracted light goes out of the HOE 117. This laser light is focused by the refractive objective lens 118 onto a data recording layer of the DVD 104 having a 0.6 mm-thick substrate. Since the refractive objective lens 118 is optimized for no spherical aberration to occur when the laser light is incident upon the DVD 104, a light spot having been collimated to the limit of diffraction will be focused on the DVD 104.

On the contrary, for playback of the CD 103, the source 111A of a laser light of 650 nm in wavelength is turned off while the source 111B for the laser light having a 780-nm wavelength is turned on, as shown in FIG. 5. The laser light is incident onto a dichroic prism 113 through a grating 112B. The dichroic prism 113 allows the laser light of 650 nm in wavelength to pass through it while reflecting a laser light having the wavelength of 780 nm. Thus, the laser light reflected by the dichroic prism 113 is incident upon the HOE 117 through a polarizing beam splitter 114, collimator lens 115, and a λ/4 plate 116.

The annular zone pitch of the HOE 117 is designed optimum to correct a spherical aberration caused by a difference in substrate thickness between the DVD 104 and CD 103 when a first-order diffracted light of 780 nm in wavelength and the refractive objective lens 118 are used in combination, as shown in FIG. 7. Also, the diffracted light on the HOE 117 is defined only in an area smaller than the pupil diameter of the refractive objective lens 118 for the DVD 104 to agree with the NA of the CD 103. Thus, the laser light of 780 nm in wavelength is irradiated to define on the data recording layer of the CD 103 a focused spot having been collimated to the limit of diffraction. Thus, a stable data reproduction is possible with little stray light and deteriorated efficiency for light utilization.

The laser light reflected from the CD 103 or DVD 104 is incident upon the polarizing beam splitter 114 through the refractive objective lens 118, HOE 117, λ/4 plate 116 and collimator lens 115. The return light from the optical disc has a polarized plane 90 deg. turned from the incident light upon the optical disc since it has passed through the λ/4 plate 116 twice. Thus, the return light is reflected by the polarizing beam splitter 114 and incident upon a photodiode (PD) 120 through a multiple lens 119. Date recorded on the optical disc can be reproduced from an output from the photodiode 120.

In the prior art disclosed in the Japanese Patent Application No. 8-121337, however, as the two laser sources 111A and 111B for laser lights of different wavelengths are disposed on the optical axis of the refractive objective lens 118, the dichroic prism 113 is required to divide the optical axis to about 90 deg., which will increase the number of necessary parts and manufacturing costs as well as in a larger structure of the apparatus.

SUMMARY OF THE INVENTION

Accordingly, the present invention has an object to overcome the above-mentioned drawbacks of the prior art by providing a more compact optical apparatus, and a method, for recording and/or reproducing data into and/or from different types of recording media including CD-R.

The above object can be accomplished by providing an optical apparatus for recording and/or reproducing data into and/or from different types of recording media, comprising, according to the present invention, a means of focusing a light of a first or second wavelength onto a first or second recording media; a first means disposed off the optical axis of the focusing means to generate a light of the first wavelength; a second means disposed on the optical axis of the focusing means to generate a light of the second wavelength; a means of correcting a coma aberration in the light of the first wavelength and guiding the corrected light along the optical axis of the focusing means; and a means of detecting the light of the first or second wavelength reflected from the first or second recording media.

Also the above object can be accomplished by providing a method for optically recording and/or reproducing data into and/or from different types of recording media, comprising, according to the present invention, steps of disposing off the optical axis of a focusing means a first means of generating a light of a first wavelength; disposing on the optical axis of the focusing means a second means of generating a light of a second wavelength; correcting a coma aberration in the light of the first wavelength and guiding the corrected light along the optical axis of the focusing means; and detecting the light of the first or second wavelength reflected from the first or second recording media.

In the above-mentioned apparatus and method for optically recording and/or reproducing data into and/or from different types of recording media, the first means of generating the light of the first wavelength is disposed off the optical axis of the focusing means, and the second means of generating the light of the second wavelength is disposed on the optical axis of the focusing means. Thus, the light of the first wavelength with a coma aberration thus corrected is guided along the optical axis of the focusing means.

Therefore, the present invention can provide a more compact optically recording and reproducing apparatus and method capable of playing back DVD as well as CDs including CD-R.

BRIEF DESCRIPTION OF THE DRAWINGS

These objects and other objects, features, aspects and advantages of the present invention will become more apparent from the following detailed description of the embodiment of the optical recording and reproducing apparatus and method according to the present invention when taken in conjunction with the accompanying drawings, in which.

DETAILED DESCRIPTION OF THE PREFERRED EMBODIMENTS

Prior to proceeding to the description of the preferred embodiments of the present invention, it should be considered, for better understanding of the present invention, of the correspondences between the means included in the claimed inventions and the elements currently available for use in practicing the present invention and referred to in the description of the embodiments. To this end, the characteristics of the present invention will be described herebelow with such means followed by parenthesized elements (one example for each means). Of course, however, the present invention is not limited only to the use of such elements in reduction to practice, but may use various other elements.

One embodiment of the optically recording and reproducing apparatus according to the present invention comprises a means (e.g., refractive objective lens 26 in FIG. 9) of focusing a light of a first or second wavelength onto a first recording media (e.g., CD 41A in FIG. 10) or second recording media (e.g., DVD 41B in FIG. 9); a first means (e.g., laser chip 21A in FIG. 10) disposed off the optical axis of the focusing means to generate a light of the first wavelength; a second means (e.g., laser chip 21B in FIG. 9) disposed on the optical axis of the focusing means to generate a light of the second wavelength, a means(e.g., HOE 25 in FIG. 10) of correcting a coma aberration in the light of the first wavelength and guiding the corrected light along the optical axis of the focusing means, and a means (e.g., photodiode 28 in FIG. 9) of detecting the light of the first or second wavelength, reflected from the first or second recording media.

Also, in the optically recording and reproducing apparatus according to another aspect of the present invention, the correcting means comprises a phase-modulating means (e.g., phase modulator 25A in FIG. 12) which is a blazed hologram consisting of annular zones (wave crests and troughs in sectional shape) each having three or more steps and formed concentrically with each other but eccentrically with respect to the center of the phase-modulating means, which will impart a phase difference to a light of the first wavelength and no substantial phase difference to a light of the second wavelength.

Further, the optically recording and reproducing method according to the present invention comprises steps of disposing off the optical axis of a focusing means (e.g., refractive objective lens 26 in FIG. 9) a first means (e.g., laser chip 21A in FIG. 10) of generating a light of a first wavelength; disposing on the optical axis of the focusing means a second means (e.g., laser chip 21B in FIG. 9) of generating a light of a second wavelength; correcting a coma aberration in the light of the first wavelength and guiding the corrected light along the optical axis of the focusing means; and detecting the light of the first or second wavelength reflected from the first or second recording media.

Figure 8:
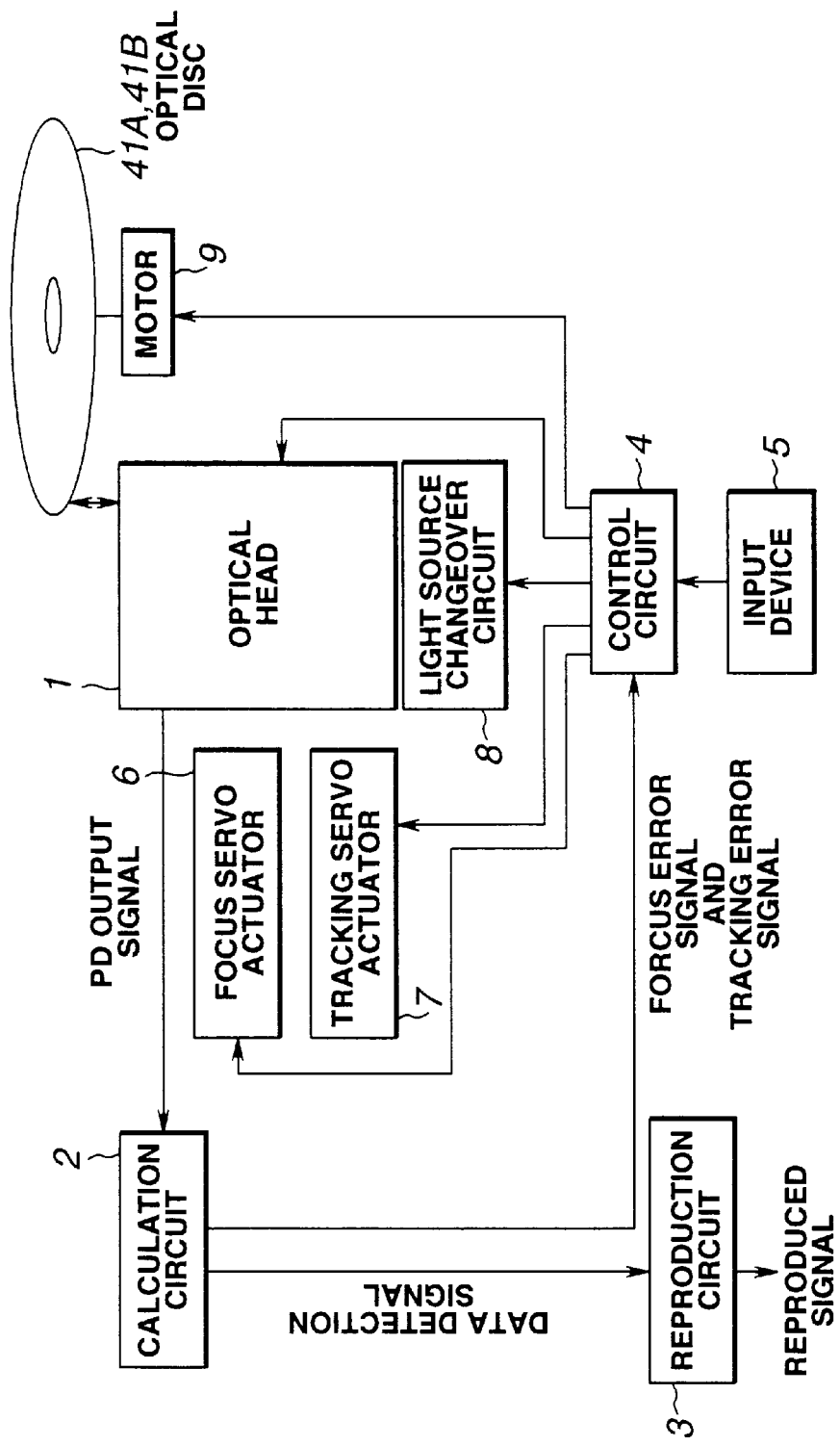
FIG. 8 is a schematic block diagram showing the configuration of a first embodiment of the optical disc drive according to the present invention.

Referring now to FIG. 8, one embodiment of the optical recording and reproducing apparatus according to the present invention comprises an optical head 1 in which two laser chips 21A and 21B as light sources are provided, one of the two generates a laser light of a predetermined wavelength, a laser light emerged from the source is focused onto an optical disc 41A (e.g., CD) or 41B (e.g., DVD) through a predetermined optical system which will be described in further detail later, a reflected light from the disc is detected by a photodetector (PD) unit 28 having a plurality of photodiodes, and an output signal from each photodiode is delivered as a PD signal to a calculation circuit 2.

The calculation circuit 2 is adapted to calculate from the PD output signal (from each photodiode) a data detection signal (RF signal), a focus error signal indicative of a deviation of the laser light focus from the optical-axial direction, and a tracking error signal indicative of a tracking deviation from the radial direction of the optical disc, all for playback of the optical disc, and to deliver the data detection signal to a reproduction circuit 3 and the focus and tracking error signals to a control circuit 4.

The reproduction circuit 3 is adapted to equalize the data detection signal received from the calculation circuit 2, then code into a binary form, decode the binary signal while correcting an error thereof, and supply it to a predetermined unit (not shown).

The control circuit 4 is adapted to control a focus servo actuator 6 based on the focus error signal supplied from the calculation circuit 2, move a first refractive objective lens 26 (as in FIG. 9) of the optical head 1 toward the direction of the optical disk the optical axis to adjust the focus, control a tracking servo actuator 7 based on the tracking error signal supplied from the calculation circuit 2, and move the optical head 1 radially of the optical disc 41A or 41B to adjust the tracking.

The control circuit 4 also controls a light source changeover circuit 8 to allow the laser chip 21A to generate a laser light of a first wavelength $\lambda 1$ (for example, 780 nm) for playback of the optical disc 41A (CD) or the laser chip 21B to generate a laser light of a second wavelength $\lambda 2$ (for example, 650 nm) for playback of the optical disc 41B (DVD).

Also the control circuit 4 controls a motor 9 to spin the optical disc 41A or 41B at a predetermined speed.

It should also be noted that the control circuit 4 is adapted to control each of the circuits based on each of the signals supplied from an input device 5 by a user operating the apparatus.

Figure 9:
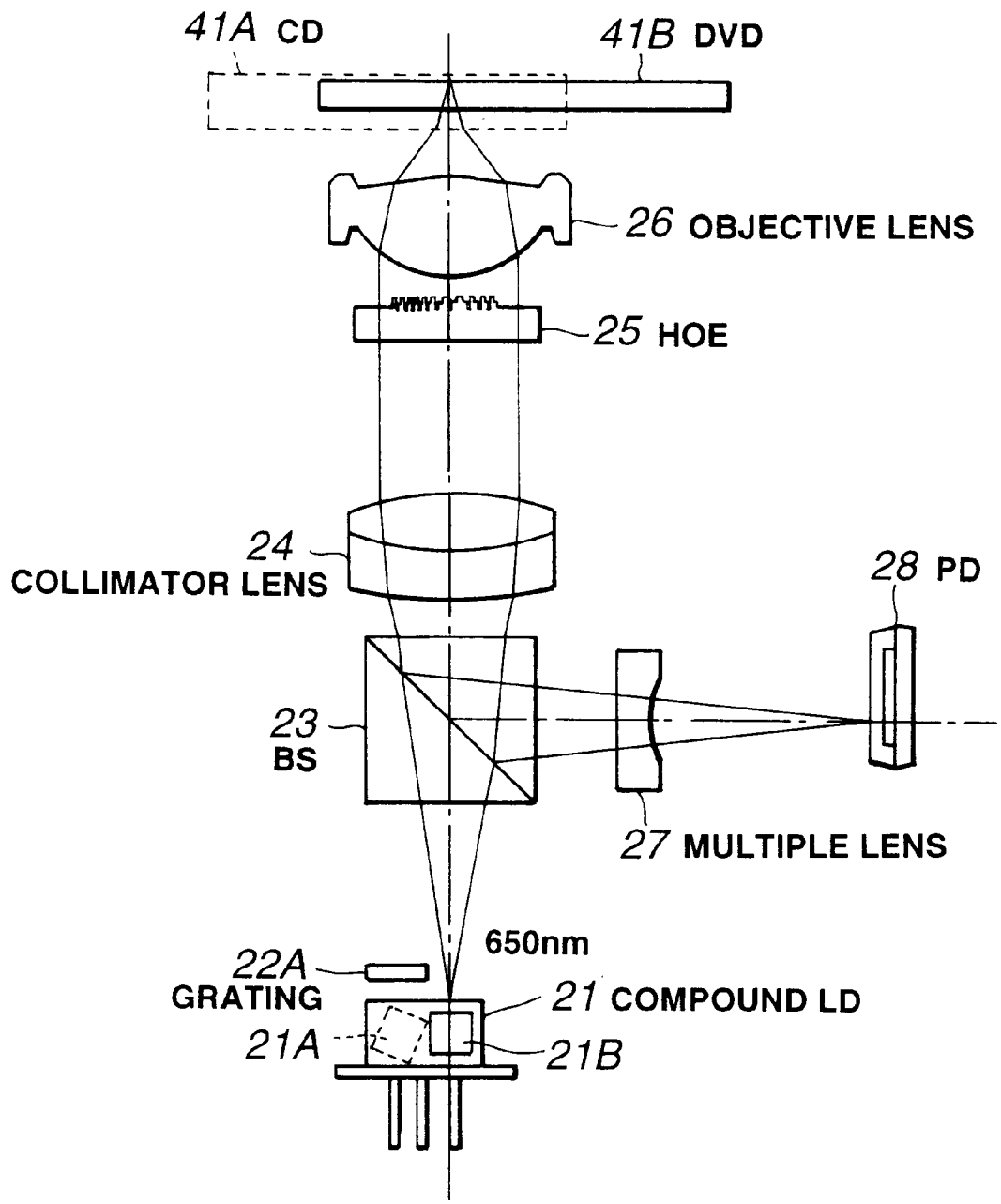
FIG. 9 shows an example of the configuration of the optical head 1 used in the first embodiment in FIG. 8.
Figure 10:
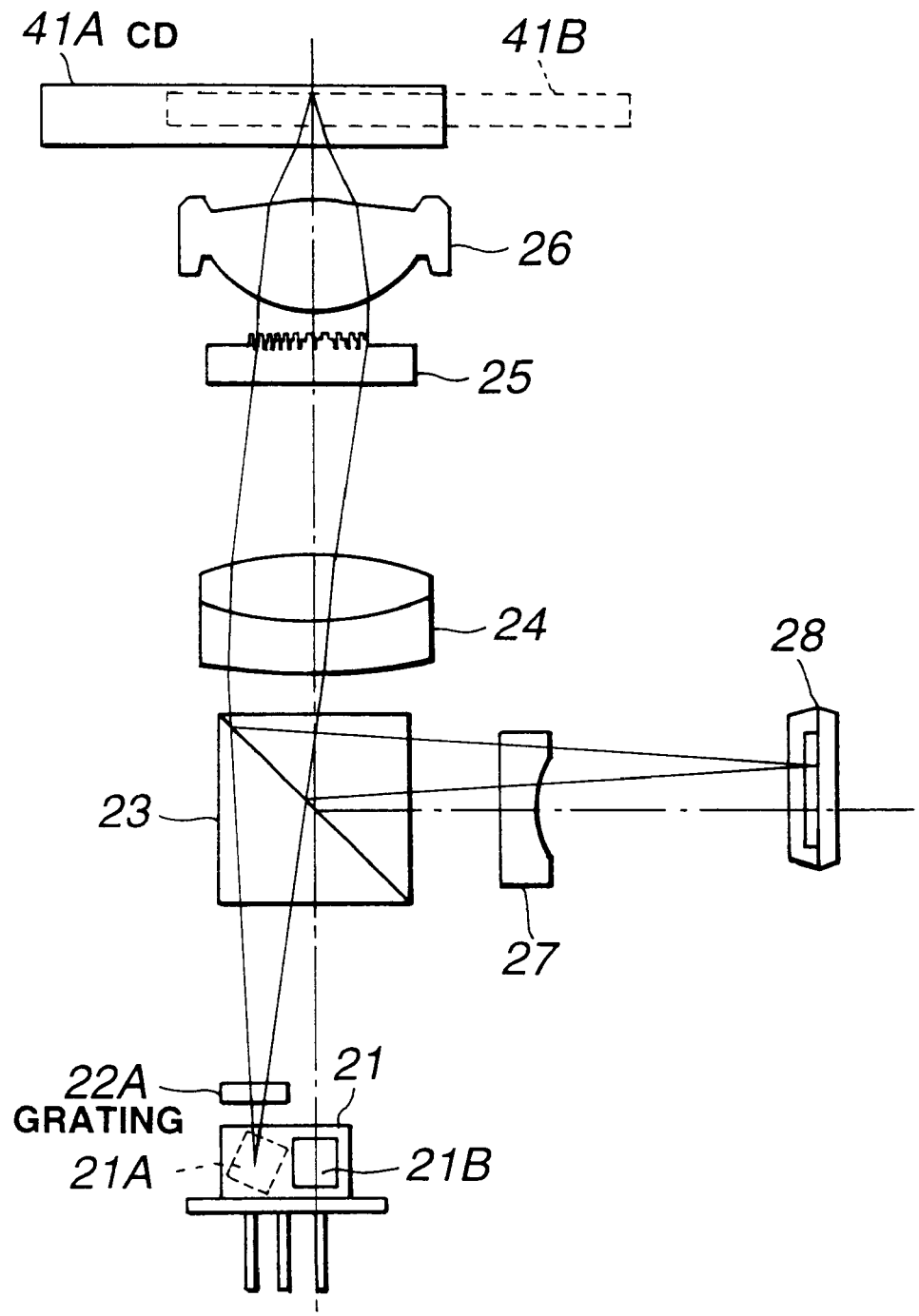
FIG. 10 shows another example of the configuration of the optical head 1 used in the first embodiment in FIG. 8.

FIGS. 9 and 10 show examples of the configuration of the optical head 1 in FIG. 8, FIG. 9 showing an optical path established for playback of the optical disc 41A while FIG. 10 shows an optical path formed for playback of the optical disc 41B. As shown, the laser chips 21A and 21B are incorporated in a compound laser diode 21. The laser chip 21A generating a laser light of the first wavelength $\lambda 1$ is disposed off the optical axis of the refractive objective lens 26, while the laser chip 21B generating a laser light of the second wavelength $\lambda 2$ is disposed on the optical axis of the refractive objective lens 26. The laser chip 21B disposed on the optical axis of the refractive objective lens 26 allows the laser light of the second wavelength $\lambda 2$ to be incident upon a beam splitter (BS) 23.

The laser chip 21A disposed off the optical axis of the refractive objective lens 26 is designed to allow the laser light of the first wavelength $\lambda 1$ to emerge toward a grating 22A. The grating 22A divides the laser light from the laser chip 21A by a substantially predetermined number (for example, three) and allows the divided laser lights to be incident upon the beam splitter (BS) 23.

The beam splitter (BS) 23 is designed to allow the laser light from the grating 22A or laser chip 21B to pass through itself and be incident upon a collimator lens 24, while reflecting the incoming laser light (reflected light from the optical disc 41A or 41B) coming from the collimator lens 24 and allowing the reflected light to be incident upon the photodetector unit 28 through a multiple lens 27.

The collimator lens 24 is designed to allow the laser lights from the BS 23 to parallel with each other and be incident upon a holographic optical element (HOE) 25 while allowing incoming parallel lights (reflected lights) from the HOE 25 to converge and be incident upon the BS 23.

The HOE 25 is adapted to allow the incoming laser lights from the collimator lens 24 to pass through itself, without substantial diffraction of them, and be incident upon the refractive objective lens 26 when the incoming laser light has the second wavelength $\lambda 2$. The refractive objective lens 26 focuses the incoming laser light of the second wavelength $\lambda 2$ onto a recording layer of the optical disc 41B through a substrate of the disc 41B. The refractive objective lens 26 is designed to have an NA and power which will define an optimum light spot on the data recording layer of the optical disc 41B when focusing the laser light through the substrate.

Also, the HOE 25 guides (synthesize) along the optical axis of the refractive objective lens 26 a negative first-order diffracted component (which may be a positive first-order diffracted one) of the incoming laser light having bypassed the optical axis through the collimator lens 24, At this time, unless a special action is taken by the HOE 25, a coma aberration will take place to avoid the influence of the coma aberration, the HOE 25 is optimized to cancel the coma aberration. The HOE 25 is designed to have annular zones formed thereon concentrically with each other but eccentrically with respect to the center of he HOE 25. Concerning this respect, the present invention will be further described later with reference to FIG. 12.

As having been described above, as the refractive objective lens 26 is optimized for the optical disc 41B having a substrate of, for example, 0.6 mm in thickness, if the above-mentioned negative first-order diffracted light is focused as it is (without any diffraction thereof) onto the optical disc 41A using a substrate of a different thickness (for example, 1.2 mm) from the substrate thickness of the optical disc 41B, a spherical aberration will arise. Therefore, the HOE 25 is also optimized to cancel a spherical aberration which will take place correspondingly to the thickness of a substrate used in the optical disc.

Furthermore, the HOE 25 is adapted to diffract an incoming laser light (reflected light), having the wavelength $\lambda 1$, from the refractive objective lens 26 by a sufficient angle to correct a spherical aberration caused by a difference in substrate thickness between the optical discs 41A and 41B, thereby producing a negative first-order diffracted light which will be allowed to pass through the HOE 25 itself and be incident upon the collimator lens 24, and to allow the incoming laser light, having the wavelength $\lambda 2$, to pass through the HOE 25 itself without any substantial diffraction thereof (namely, zero-order diffracted light) and be incident upon the collimator lens 24.

The refractive objective lens 26 is designed to focus a laser light diffracted through the HOE 25 onto the data recording layer of the optical disc 41A to the limit of diffraction. It is also designed to allow a laser light reflected from the optical disc 41A or 41B to be incident upon the HOE 25.

The multiple lens 27 serves to astigmatize an incoming laser light from the BS 23 for the purpose of focus controlling, and the astigmatized light is incident upon the photodetector unit 28 consisting of the plurality of photodiodes as previously mentioned. In each of the photodiodes, a reflected light coming from the optical disc 41A or 41B and incident upon the photodiode through the above-mentioned optical system is converted to an electrical signal which will be delivered as a PD output signal to the calculation circuit 2.

Figure 11:
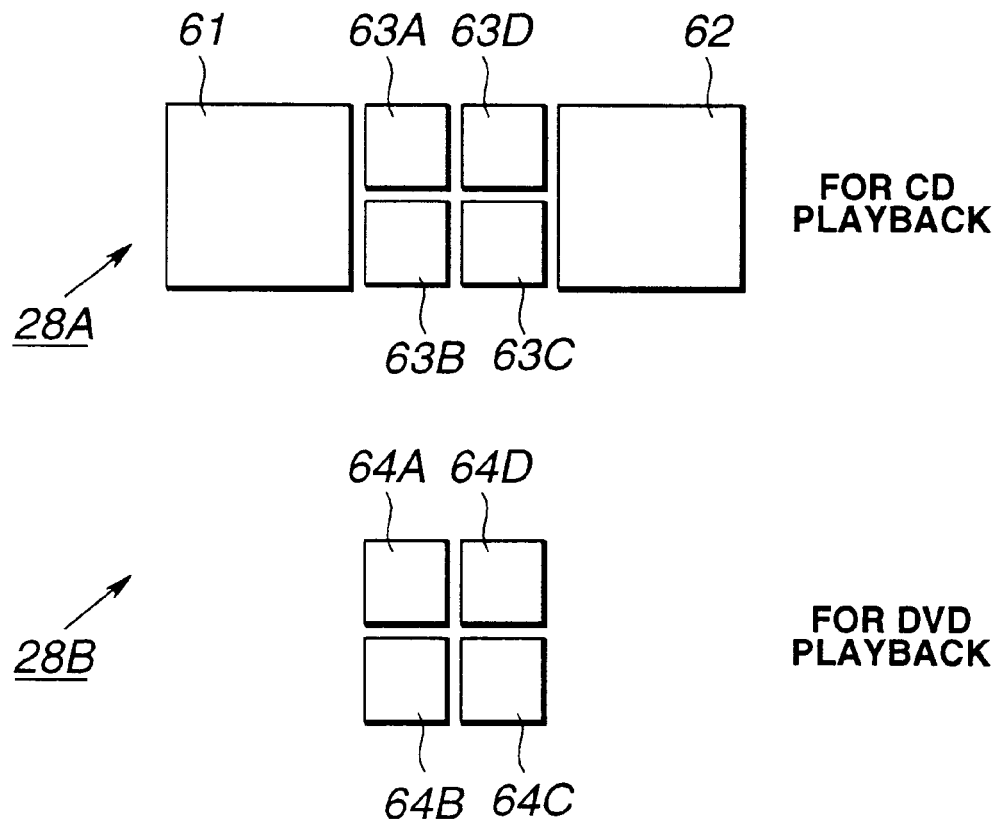
FIG. 11 shows a layout pattern of the photodetector elements in the photodetector unit 28 in FIG. 9.

FIG. 11 shows an example of the layout pattern of the photodetector elements in the photodetector unit 28. As seen, the photodetector unit 28 includes a photodetector part 28A to detect a reflected light from a CD (of the wavelength λ1), and a photodetector part 28B to detect a reflected light from a DVD (having the wavelength λ2). For playback of a CD, a so-called three-beam method is adopted for tracking the CD. To support this tracking method, the photodetector part 28A essentially comprises photodetector elements 61, 62 and 63. The calculation circuit 2 calculates a difference between outputs of the photodetector elements 61 and 62 to produce a tracking error signal. As shown, the photodetector element 63 is a quad detector consisting of four quadrants 63A to 63D. For a focus controlling based on the astigmatism, the calculation circuit 2 produces a focus error signal from a difference between a sum of outputs from the photodetector quadrants 63A and 63C and a sum of outputs from the quadrants 63B and 63D.

On the other hand, for playback of a DVD, a DPD (Differential Phase Detection) method is employed for tracking, and the astigmatism is for focus controlling. To attain these purposes, the photodetector part 28B is a quad or four-element photodetector consisting of four photodetector elements or quadrants 64A to 64D as shown in FIG. 11. The calculation circuit 2 calculates a difference between a sum of outputs from the photodetector quadrants 64A and 64C and a sum of outputs from the photodetector quadrants 64B and 64D to produce a focus error signal. Also, the circuit 2 calculates a sum (A+B) of outputs from the quadrants 64A and 64B, a sum (C+D) of outputs from the quadrants 64C and 64D, and further a phase difference between a sum ((A+B)+(C+D) and a difference ((A+B)−(C+D)) to produce a tracking error signal.

Furthermore, the calculation circuit 2 produces a data detection signal for a CD from a sum of outputs from the detector quadrants 63A to 53D, and a data detection signal for a DVD from a sum of outputs from the quadrants 64A to 64D.

Figure 12A:
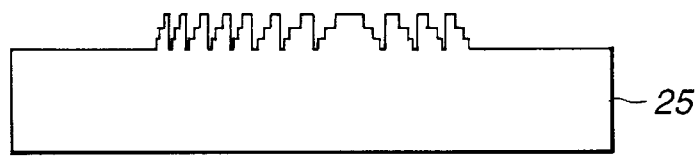
FIG. 12 consisting of FIGS. 12A through 12B shows an example of the configuration of the HOE 25 in FIG. 9.
Figure 12B:
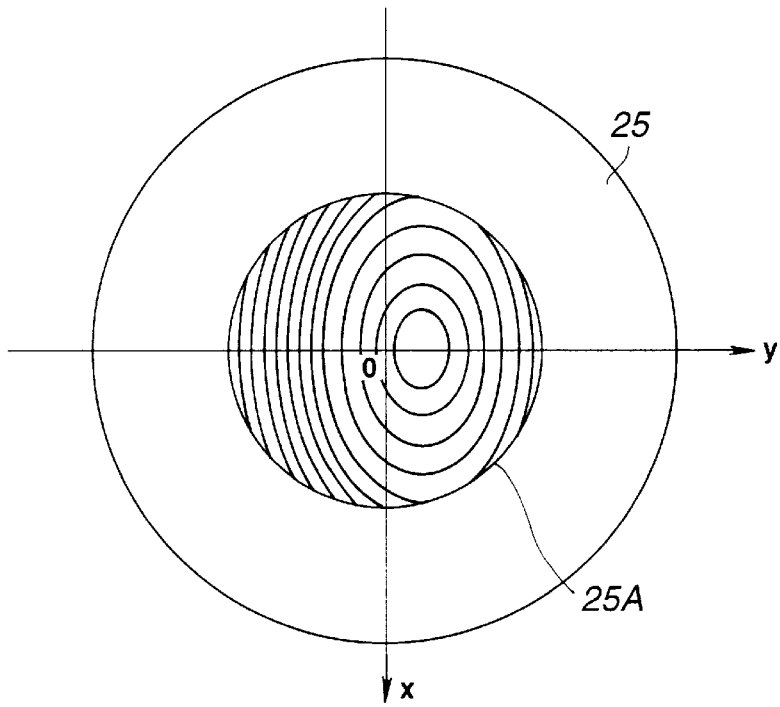
Figure 13A:
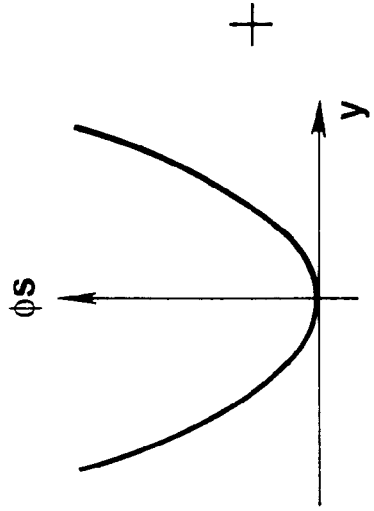
FIG. 13 consisting of FIGS. 13A through 13C illustrates a spherical aberration and how to correct coma aberration.

The HOE 25 will be described in further detail herebelow. The diffraction efficiency of the HOE 25 may be represented by a phase difference equally imparted to incoming lights by the HOE 25. As shown in FIGS. 12A and 12B, when an x-y coordinate having a center at an intersection O between the x and y axes is set on the diffraction surface of the phase modulator 25A of the HOE 25, a function of phase difference for correction of a spherical aberration may be represented by a curved surface having a rotation symmetry about the optical axis and an apex at the intersection O, This curved surface is represented by fs as shown in FIG. 13A and which may be expressed as follows:

$$\phi s = C_1 r^2 + C_2 r^4 + C_3 r^6 + C_4 r^8 + \ldots$$

where $r^2 = x^2 + y^2$ and $C_1, C_2, \ldots$ are constants.

Figure 13B:
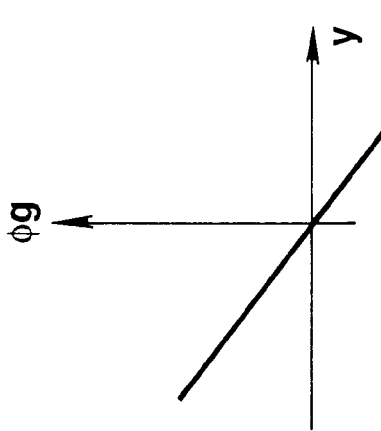

On the other hand, the phase difference function fg for synthesis, on the optical axis, of a light from the laser chip 21A disposed off the optical axis shows a linearity as shown in FIG. 13B and may be expressed as follows:

$$\phi g = c_0 y$$

where $C_0$ is a constant.

Figure 13C:
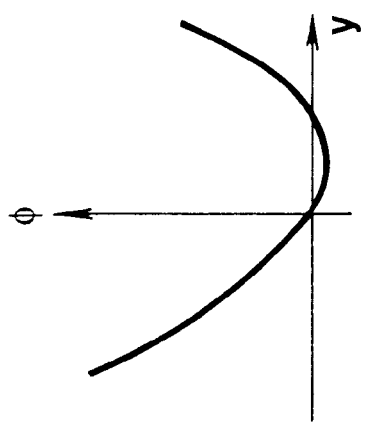

Thus, the HOE 25 is designed to have a phase difference function expressed as follows and having both a function to synthesize a light and a function to correct a spherical aberration, as shown in FIG. 13C:

$$\phi = \phi s + \phi g$$
$$= C_0 y + C_1 r^2 + C_2 r^4 + C_3 r^6 + C_4 r^8 + \ldots$$

Figure 14:
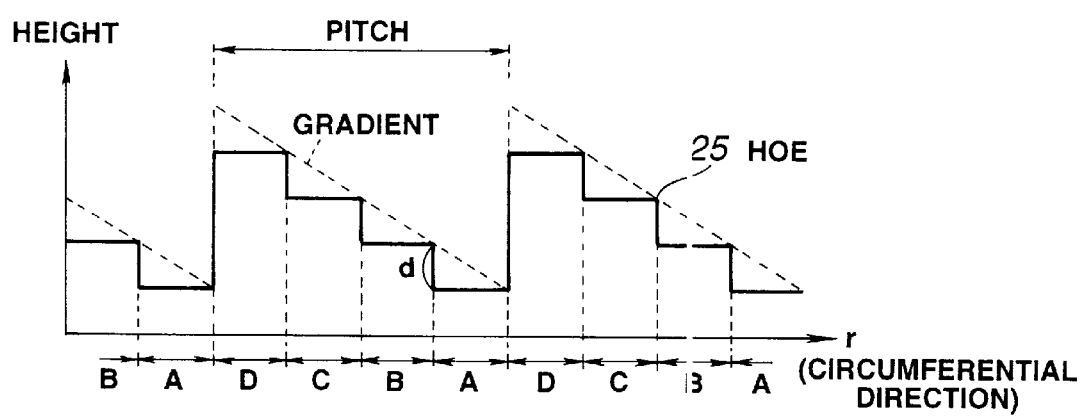
FIG. 14 is a sectional view, partially enlarged in scale, of an example of the HOE 25 in FIG. 9.

FIG. 14 shows, as enlarged in scale, one side of the HOE 25 that faces the refractive objective lens 26. Thus, the HOE 25 has a blazed hologram consisting of annular zones formed concentrically with each other but eccentrically with respect to the center of the HOE 25, each having four steps of which each has a height d. The annular zones are formed to have optimum diameters which assure n optimum light spot size on the recording surface of the optical disc 41A (namely, for an optimum NA for the optical disc 41A).

More particularly, the zone on the HOE 25 in which the steps are formed is designed to have a predetermined diameter smaller than the NA of the refractive objective lens 26, whereby an NA for a light of the wavelength λ1 (onto the optical disc 41A) is substantially defined. Note that the other side of the HOE 25 facing the collimator lens 24 has a flat surface.

The annular zone pitch of the HOE 25 is set to a value which assures a desired angle of diffraction to correct, when a laser light of the wavelength λ1 is irradiated to the optical disc 41A having a substrate of t1 in thickness after playback, with a laser light of the wavelength λ2, of the optical disc 41B having a substrate of t2 in thickness, a spherical aberration caused by a difference of the substrate thickness t1 from t2, and an axial chromatic aberration arisen due to a difference in wavelength between the optical discs 41A and 41B.

Also, the number N of the steps of each of the annular zones of the HOE 25 and the height d of each step (the number H and height d define together a height (depth) (N−1)d of the HOE 25 are set according to the wavelengths λ1 and λ2 of laser lights used. Namely, the number N of the steps of each annular zone is set to a value $N_0$ (integer) that can be calculated from the following formula:

$$N_0 = \lambda 1 / (q \times \lambda 1 - p \times \lambda 2)$$

or $$N_0 = \lambda 1 / (p \times \lambda 2 - q \times 1)$$

where p and q are predetermined positive integers. Alternatively, it is set to an integer approximate to the value N and with which the diffraction efficiency of a zero-order diffracted light with respect to the wavelength λ1 (ratio between incoming amount of light and outgoing amount of light) is smaller than the diffraction efficiency of a first-order diffracted light or a negative first-order diffracted light. In effect, the relationships between N and λ1 and λ2 may be set in such a range that a minimum diffraction efficiency and stray light with no practical problems can be attained with no complete optimization.

Further, the height d of each step is set to a value $d_0$ ($d=d_0$) determined from the following formula:

$$d_0 = p \times \lambda 2 / (n-1)$$

where p is a predetermined positive integer and n is a refractive index of the HOE 25. Alternatively, the number N is set to an integer approximate to the value d and with which the diffraction efficiency of a zero-order diffracted light with respect to the wavelength λ2 (ratio between incoming amount of light and outgoing amount of light) is larger than the diffraction efficiency of a first-order diffracted light or a negative first-order diffracted light.

Figure 15A:
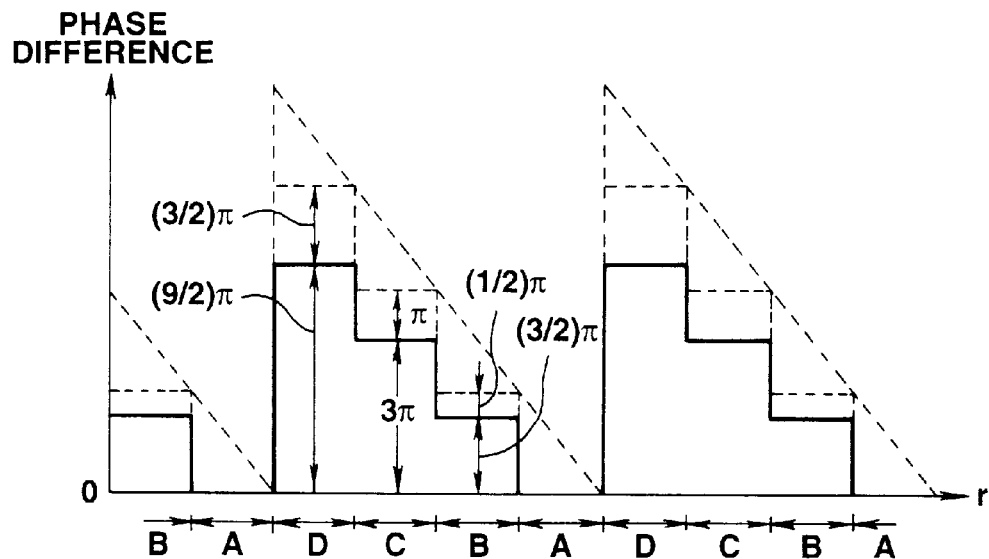
FIG. 15 consisting of FIGS. 15A through 15B shows an example of the phase characteristic of a laser light having a wavelength λ1 and having passed through the HOE 25 in FIG. 9.

For example, when a laser light (parallel lights) is incident upon the HOE 25 with annular zones each having a number $N_0$ of steps of which each has a height $d_0$ calculated on an assumption that the integers p and q are 1 (one), respectively, the HOE 25 will change the phase of the incoming laser light according to the thickness of each of portions or areas A to D of the HOE 25. When a laser light of the first wavelength $\lambda 1$ is incident upon the HOE 25, the laser light having passed through an area B shown in FIG. 14 is imparted a phase difference of about $(3/2)\pi$ radians, as shown in FIG. 15A, with reference to the laser light having passed through an area A in FIG. 14. Similarly, the laser light having passed through an area C in FIG. 14 is imparted a phase difference of about $(6/2)\pi$ radians, and the laser light having passed through an area D in FIG. 14 is imparted a phase difference of about $(9/2)\pi$ radians.

Figure 15B:
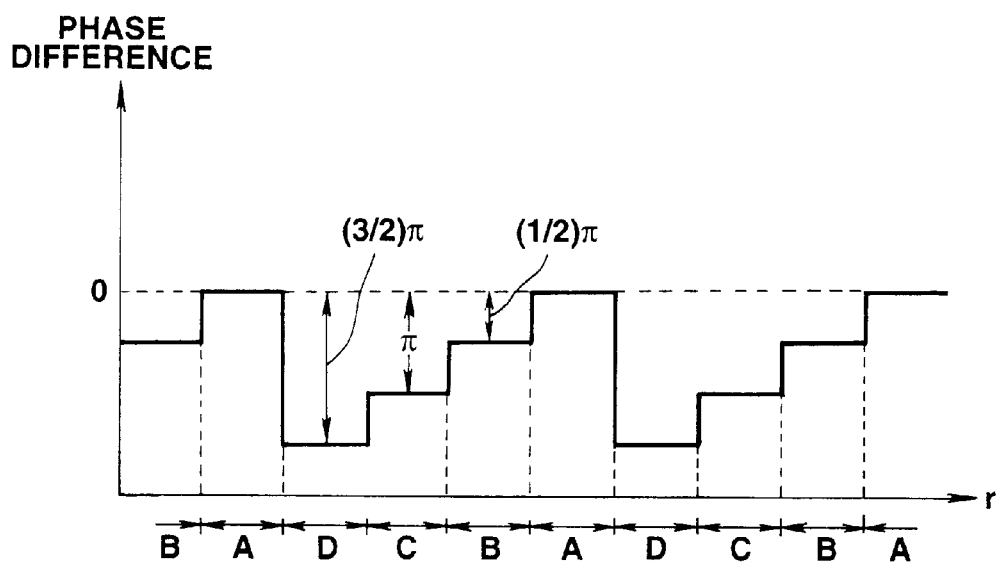

Even if an integral multiple of $2\pi$ radians of phases is added to or subtracted from a phase difference, the phase difference remains unchanged. So, a phase difference shown in FIG. 15A may be rewritten to a one shown in FIG. 15B. More particularly, when a laser light of a wavelength $\lambda 1$ is incident upon the HOE 25, the laser light having passed through the area B is imparted a phase difference of about $(½)\pi$ radians with reference to the laser light having passed through the area A. Similarly, the laser light having passed through the area C is imparted a phase difference of about $\pi$ radians, and the laser light having passed through the area D is imparted a phase difference of about $(3/2)\pi$ radians. In this way, a laser light of the wavelength $\lambda 1$ is imparted a phase difference corresponding to an area of the HOE 25 upon which it is incident, and thus diffracted correspondingly.

Figure 16A:
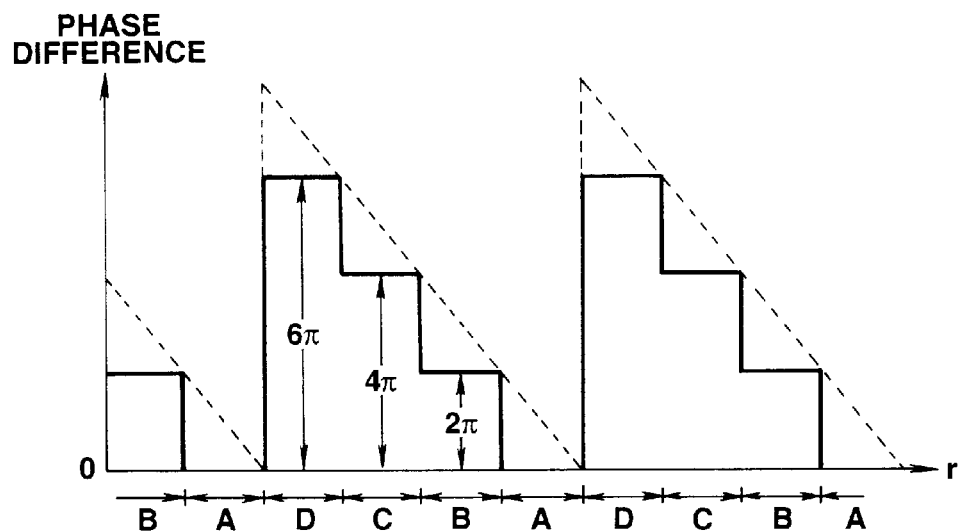
FIG. 16 consisting of FIGS. 16A through 16B shows an example of the phase characteristic of a laser light having a wavelength λ2 and having passed through the HOE 25 in FIG. 9.

On the other hand, when a laser light of the second wavelength $\lambda 2$ is incident upon the HOE 25, the laser light having passed through the area B in FIG. 14 is imparted a phase difference of about $2\pi$ radians, as shown in FIG. 16A, with reference to the laser light having passed the area A in FIG. 14. Similarly, the laser light having passed through the area C in FIG. 14 is imparted a phase difference of about $4\pi$ radians, and the laser light having passed through the area D in FIG. 14 is imparted a phase difference of about $6\pi$ radians.

Figure 16B:
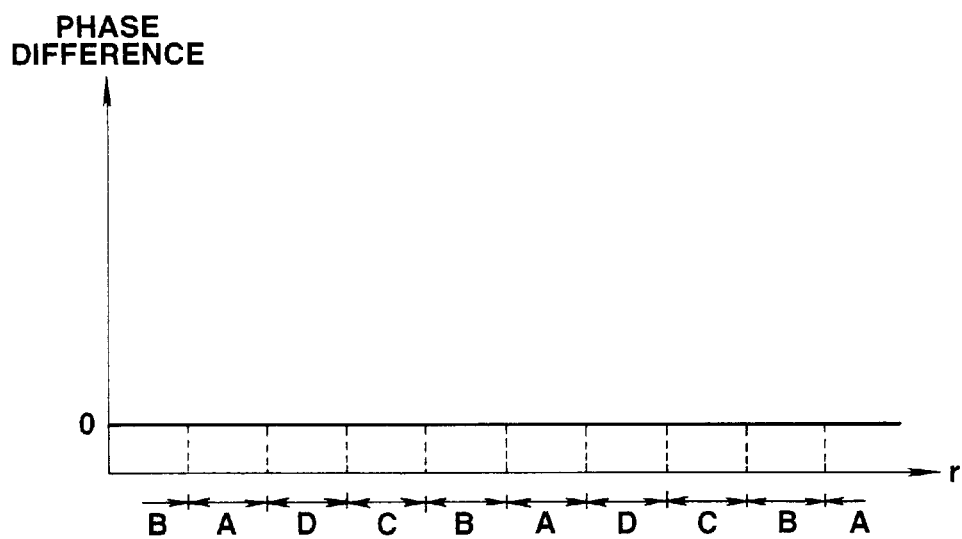

As mentioned above, even if an integral multiple of $2\pi$ radians of phases is added to or subtracted from a phase difference, the phase difference remains unchanged. So, a phase difference shown in FIG. 16A may be rewritten as shown in FIG. 16B. More particularly, when a laser light of a wavelength $\lambda 2$ is incident upon the HOE 25, the phase difference between the laser light having passed through one of the areas A to D and the laser light having passed through the other area, is generally zero so that the laser light of the wavelength $\lambda 2$ is allowed to transmit through the HOE 25, not substantially being diffracted by the HOE 25.

By designing the HOE 25 to show a power (of diffraction) against a laser light having one (11) of the wavelengths and no such power against a laser light of the other wavelength (12), it is possible to focus laser lights of different wavelengths onto different areas, respectively, of the HOE 25, thereby reducing (to within 0.2 mm, for example) the difference between a moving distance of the refractive objective lens 26 (working distance from the forward end thereof to an optical disc) required for playback of one of different types of recording media and a one required for playback of the other or another type.

Since the refractive objective lens 26 is optimized for focusing of a light of the wavelength $\lambda 2$ onto the optical disc 41B, no aberration will take place. Furthermore, aberrations arisen in a light of the wavelength $\lambda 1$ passing through the refractive objective lens 26 and optical disc 41A can be corrected by the HOE 25. Thus, a light of any wavelength can be focused to define a good spot on each optical disc.

Figure 17:
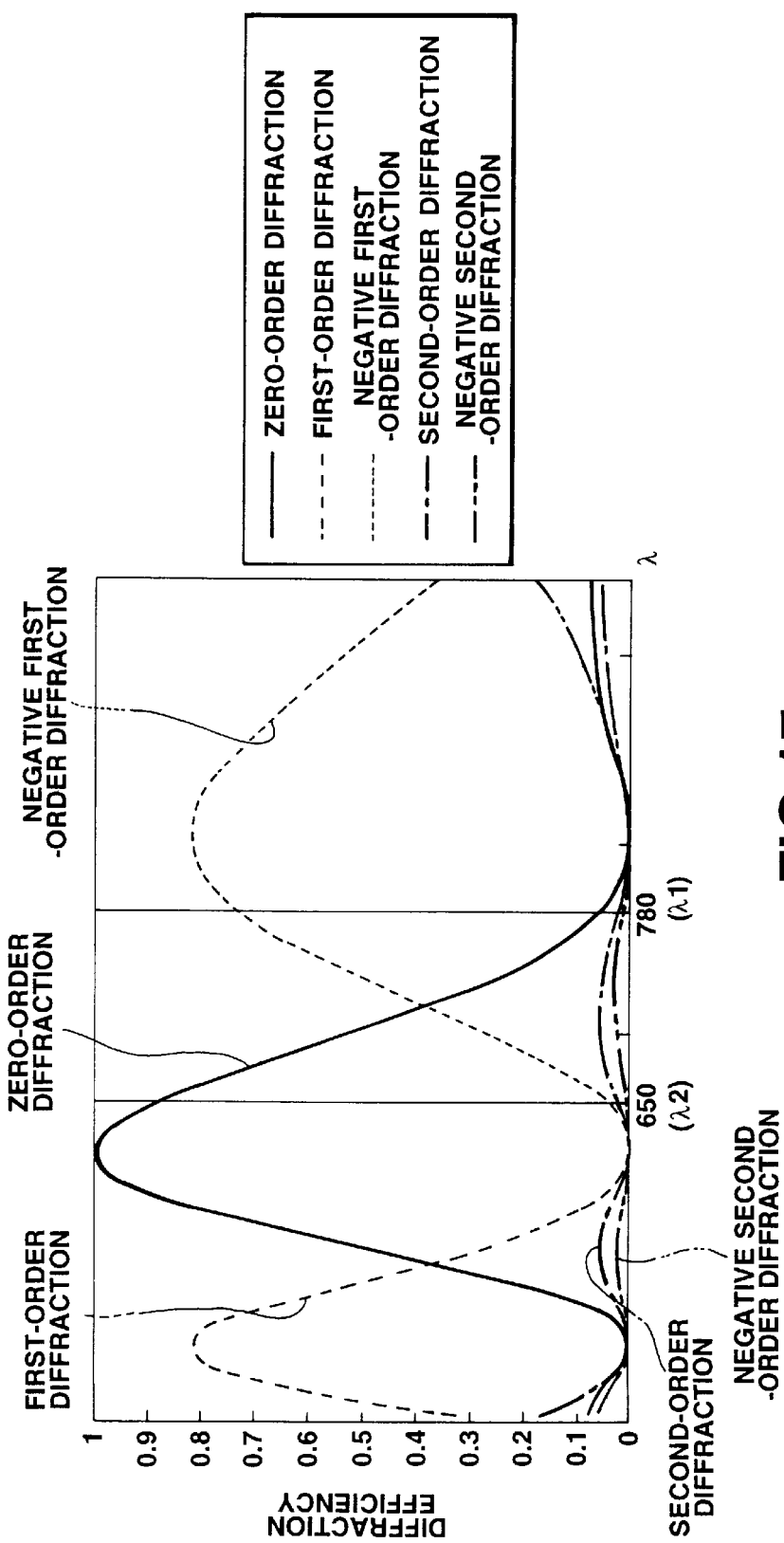
FIG. 17 shows the diffraction efficiency of the HOE 25 in FIG. 9.

FIG. 17 shows an example of the diffraction efficiency (ratio of incoming light amount to outgoing light amount) of the HOE 25. Such a characteristic can be attained by forming the light diffraction zone (phase modulator) 25A of the HOE 25 to have four steps each having a height d slightly smaller than $650/(n-1)$ nm. The HOE 25 is designed to show a diffraction efficiency of the zero-order diffracted light (namely, transmitted light) that is generally 90% for a light of the wavelength $\lambda 2$. Therefore, 90% of an incoming laser light of the second wavelength $\lambda 2$ is allowed to pass through the HOE 25 as a zero-order diffracted light.

That is to say, when passing through the HOE 25, the incoming laser light of the second wavelength $\lambda 2$ is attenuated 10%. Even when the laser light of the second wavelength $\lambda 2$ has passed through the HOE 25 two times (toward and back from the optical disc 41B), it will only be attenuated about 20% in total (10% for forwarding and 10% for returning), which means that about 80% of the laser light once generated can be used to read or write data from or into the optical disc 41B.

On the other hand, since the HOE 25 has a diffraction efficiency of about 72% for a negative first-order diffracted light of the wavelength $\lambda 1$, a laser light of the wavelength $\lambda 1$ will be attenuated to about 72% in amount and diffracted through a predetermined angle of diffraction as a negative first-order diffracted light, and passed through the HOE 25.

As mentioned above, a laser light of the first wavelength $\lambda 1$ passing through the HOE 25 is attenuated to about 72% in amount. Even with two times of passing through the HOE 25 (toward and back from the optical disc 41A), the laser light of the second wavelength $\lambda 1$ will retain about 52% ($=0.72\times0.72\times100\%$) of its initial amount which is sufficient enough to read or write data from or into the optical disc 41A.

It should be noted that the laser light generated from the laser chips 21A and 21B may be considered to be is in a sufficiently narrow band of wavelength and have a substantially single wavelength. Hence, when a zero-order diffracted light, or a negative first-order diffracted light, of the wavelength $\lambda 1$ is produced by the HOE 25, little undesired diffracted lights of any other orders will take place, which will permit to enhance the efficiency for utilization of the optical energy and inhibit a stray light from taking place.

By designing each of the annular zones to have three or more steps (N=3 or more), it is possible to provide an HOE 25 showing a better efficiency for utilization of the optical energy. More specifically, four or more steps of each annular zone will further raise the efficiency for utilization (diffraction efficiency) of the optical energy as described in the foregoing. On the contrary, two such steps will result in a worse efficiency for utilization (diffraction efficiency) of the laser light and cause undesired first-order diffracted light with a same diffraction efficiency as that of a negative first-order diffracted light used to read or write data into an optical disc. The undesired diffracted light will undesirably become a stray light.

Further, if each ridge is designed to have two steps, the gap between the wavelengths $\lambda 1$ and $\lambda 2$ is increased so that it is difficult to set the wavelength $\lambda 1$ approximate to 780 nm and the wavelength $\lambda 2$ to 650 nm. With four such steps, the wavelengths can be set approximate to these values, respectively. With annular zones each having five such steps, it is possible to set the wavelentgths $\lambda 1$ and $\lambda 2$ most approximate to 780 and 650 nm, respectively. The four-stepped annular zone structure of the HOE 25 can be formed by etching a substrate with two times of masking. However, forming the five-stepped ridge structure needs to use a mold and the like, which will lead to an increased manufacturing cost.

The embodiment of the present invention shown in FIGS. 8 and 9 functions as will be described below:

When given an instruction for playback of the DVD 41B by the user operating the input device 5, the control circuit 4 will control the light source changeover circuit 8 to selectively drive the laser chip 21B as shown in FIG. 9. The laser chip 21B will generate a laser light of 650 nm in wavelength. The laser light is incident upon the collimator lens 24 through the BS 23 and converted to parallel lights which will be incident upon the HOE 25.

Figure 18:
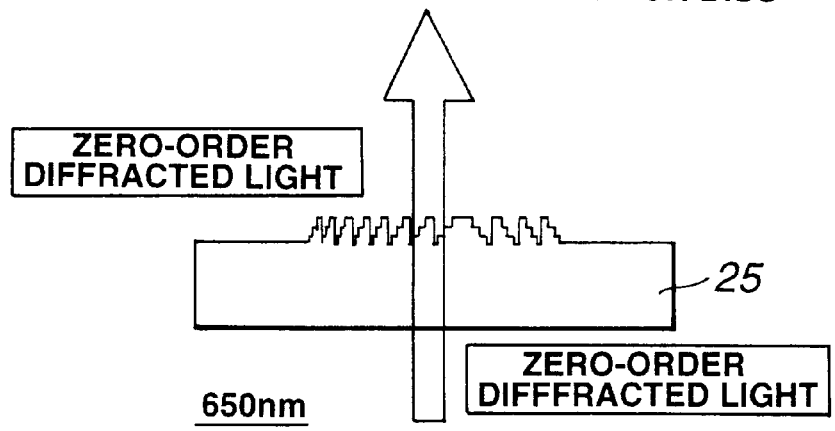
FIG. 18 illustrates the operation of the HOE 25 in FIG. 9 when irradiated with a laser light having the second wavelength.

As having previously been described, the HOE 25 will allow the majority (90%) of the incoming light to pass through itself. Namely, a zero-order diffracted light retaining 90% in amount of the incoming light will go out of the HOE 25 as shown in FIG. 18. The light from the HOE 25 is incident upon the refractive objective lens 26 disposed following the HOE 25. The objective lens 26 will focus the incoming light onto the DVD 41B. The refractive objective lens 26 is optimized to correct a spherical aberration taking place when the zero-order diffracted light is irradiated onto the recording layer of the DVD 41B through the 0.6 mm-thick substrate. Thus, a good light spot focused nearly to the limit of diffraction will be defined on the data recording layer of the DVD 41B.

Figure 19:
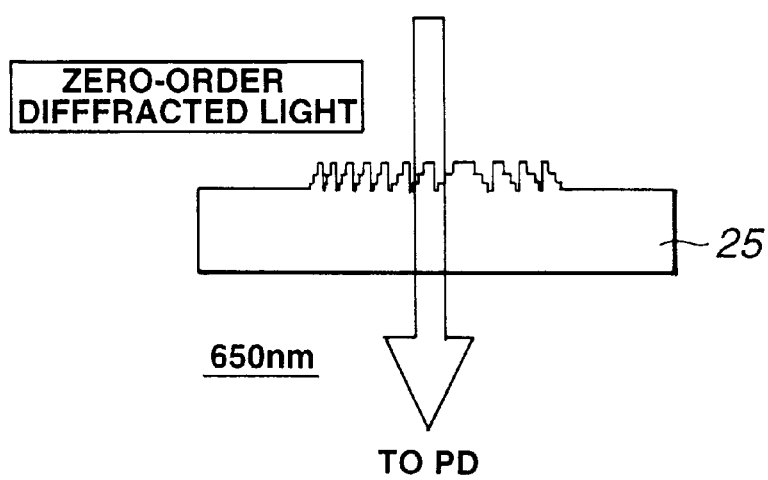
FIG. 19 illustrates the operation of the HOE 25 in FIG. 9 when irradiated with a reflected light from a disc.

The incident light is reflected at the data recording layer of the DVD 41B, and then collected by the refractive objective lens 26 to be parallel lights. The parallel lights are incident upon the HOE 25. As shown in FIG. 19, the HOE 25 will allow the incoming lights to pass through it without substantial affect to the lights. Namely, a zero-order diffracted light will go out of the HOE 25. The HOE 25 will diffract a light with an efficiency of 90%, and thus a same light will be diffracted here two times (when it goes out toward the disc and when it comes back from the disc). Namely, the return light leaving the HOE 25 will retain about 80% (=0.9×0.9×100%) of the initial incident light.

The return light is converged by the collimator lens 24, and incident upon the BS 23. The BS 23 will reflect the incoming light toward the multiple lens 27 which will astigmatize the incident laser light. The light will further propagate to the photodetector unit 28.

In this photodetector unit 28, the laser light reflected back from the DVD 41B is detected by the photodetector part 28B. The calculation circuit 2 calculates a focus error signal from a difference ((A+C)−(B+D)) between a sum of outputs from the photodetector quadrants 64A and 64C and a sum of outputs from the photodetector quadrants 64B and 64D. Further, the calculation circuit 2 calculates a phase difference between a sum ((A+B)+(C+D)) of outputs from the quadrants and the above difference ((A+C)−(B+D)) to produce a tracking error signal. Moreover, it produces a data detection signal from the sum of the outputs from the quadrants 64A to 64D.

The control circuit 4 will be supplied with the focus error signal and tracking error signal from the calculation circuit 2, and control the focus servo actuator 6 and tracking servo actuator 7 correspondingly to the focus and tracking error signals, respectively, thereby controlling the focus servo and tracking servo systems.

The data detection signal is input to the reproduction circuit 3 where it will be demodulated. A signal thus generated is delivered as a reproduced signal to a circuit (not shown).

On the other hand, when supplied with an instruction for playback of the CD 41A by the user operating the input device 5, the control circuit 4 will control the light source changeover circuit 8 to select and drive the laser chip 21A as shown in FIG. 10. The laser chip 21A will thus generate a laser light of 780 nm in wavelength. The laser light is incident upon the grating 22A which will divide the light into substantially three laser beams (for three-beam control). These three beams are incident upon the HOE 25 through the BS 23 and collimator lens 24.

Figure 20:
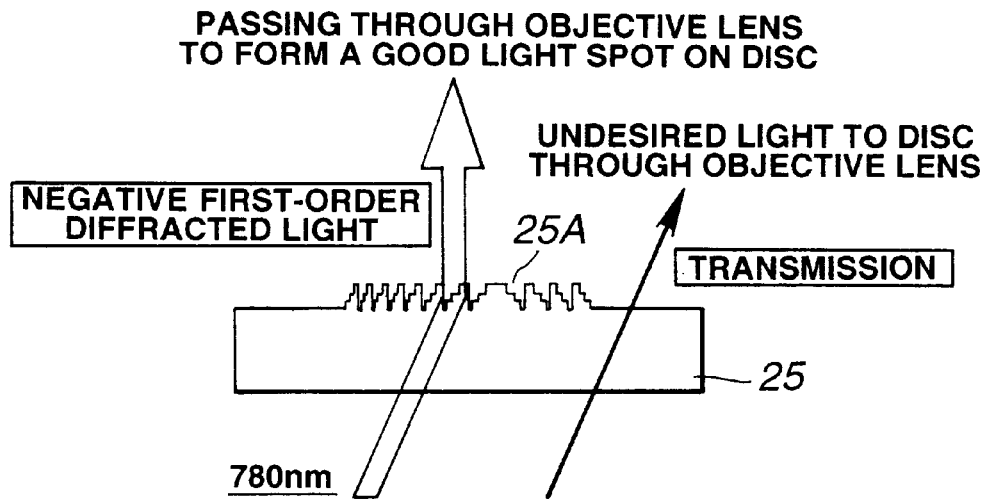
FIG. 20 illustrates the operation of the HOE 25 in FIG. 10 when irradiated with a laser light from other than the optical axis.

The laser chip 21A is disposed off the optical axis of he refractive objective lens 26, so that the laser beams bypassing the optical axis will be incident upon the HOE 25. As shown in FIG. 20, the HOE 25 will diffract the incoming light to make a negative first-order diffracted light retaining about 70% of the optical energy of the incoming light and which will go out as an axial light from the HOE 25.

The negative first-order diffracted light will be focused by the refractive objective lens 26 onto the data recording layer of the CD 41A through a substrate of 1.2 mm in thickness. The refractive objective lens 26 is optimized to cancel a spherical aberration for playback of the DVD 41 B having a 0.6 mm-thick substrate. Therefore, when the CD 41A incorporating a 1.2 mm-thick substrate is played back, a spherical aberration will take place. The HOE 25 is designed to correct such spherical aberration as well. Also, it is adapted to correct a coma aberration which will take place when an incident light having bypassed the optical axis is allowed to go out as an axial light. Therefore, the laser light will be focused on the data recording layer of the CD 41A to the limit of diffraction to form an optimum light spot thereon.

Figure 21:
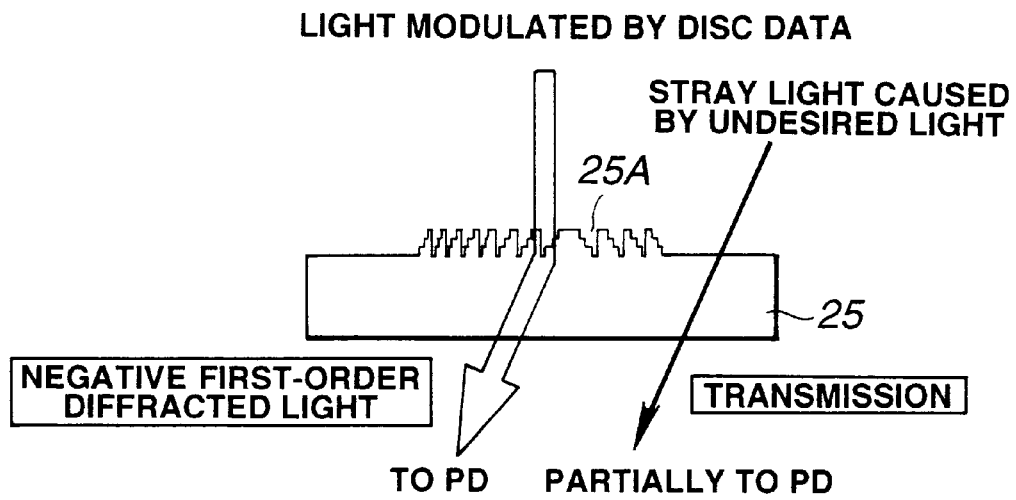
FIG. 21 illustrates the operation of the HOE 25 in FIG. 10 when irradiated with a reflected light from a disc.

The laser light reflected at the data recording layer of the CD 41A is converged by the refractive objective lens 26 onto the HOE 25. As shown in FIG. 21, the laser light modulated by the data on the data recording layer of the CD 41A is diffracted by the HOE 25 to go out as a negative first-order diffracted light along an optical path off the optical axis. As in the case of the DVD playback, the negative first-order diffracted light will retain about 70% of the optical energy of the incoming reflected light from the CD 41A. In effect, about 49% (=0.7×0.7×100%) of the optical energy of the laser light emitted from the laser chip 21A will be utilized.

The laser light leaving the HOE 25 travels on an optical path off the optical axis and is incident upon the collimator lens 24 where it will be converged and further travel to the BS 23. The incoming light is reflected by the BS 23 toward the multiple lens 27. The light is astigmatized through the multiple lens 27 and then incident upon the photodetector unit 28.

In the photodetector unit 28, the photodetector part 28A detects an incoming light as shown in FIG. 11. Of the photodetector part 28A, the photodetector element 63 will receive the central one of the three laser beams resulted from the division at the grating 22A and having been reflected back in the preceding procedure, while the photodetector elements 61 and 62 on either side of the central photodetector element 63 will detect the other laser beams on either side of the central one, respectively. The calculation circuit 2 produces a tracking error signal from a difference between outputs from the photodetector elements 61 and 62, and a focus error signal from a difference between a sum of outputs from the photodetector quadrants 63A and 63C and a sum of outputs from the photodetector quadrants 63B and 63D. Also, it produces a data detection signal from a sum of outputs from the photodetector quadrants 63A to 63D.

The refractive objective lens 26 has an effective pupil radius predetermined to provide an optimum numerical aperture (NA) of 0.6 for playback of the DVD 41B. On the other hand, the optimum NA of the CD 41A is predetermined to be about 0.45. For such optimum numerical apertures (NA), the area of the HOE 25 in which the diffraction zone (phase modulator) 25A is formed is designed to be smaller than the effective pupil area of the refractive objective lens 26. Thus, there is a likelihood that a laser light having passed through an area of the HOE 25 where the diffraction zone 25A is not formed as shown in FIG. 20 is incident as an undesired light upon the CD 41A, and reflected back from the CD 41A as shown in FIG. 21. A part of the reflected light will be incident upon the photodetector part 28A and possibly have some influence on the servo signals. However, this light is negligible in practice since it is extremely small in amount and has a large aberration.

Figure 4:
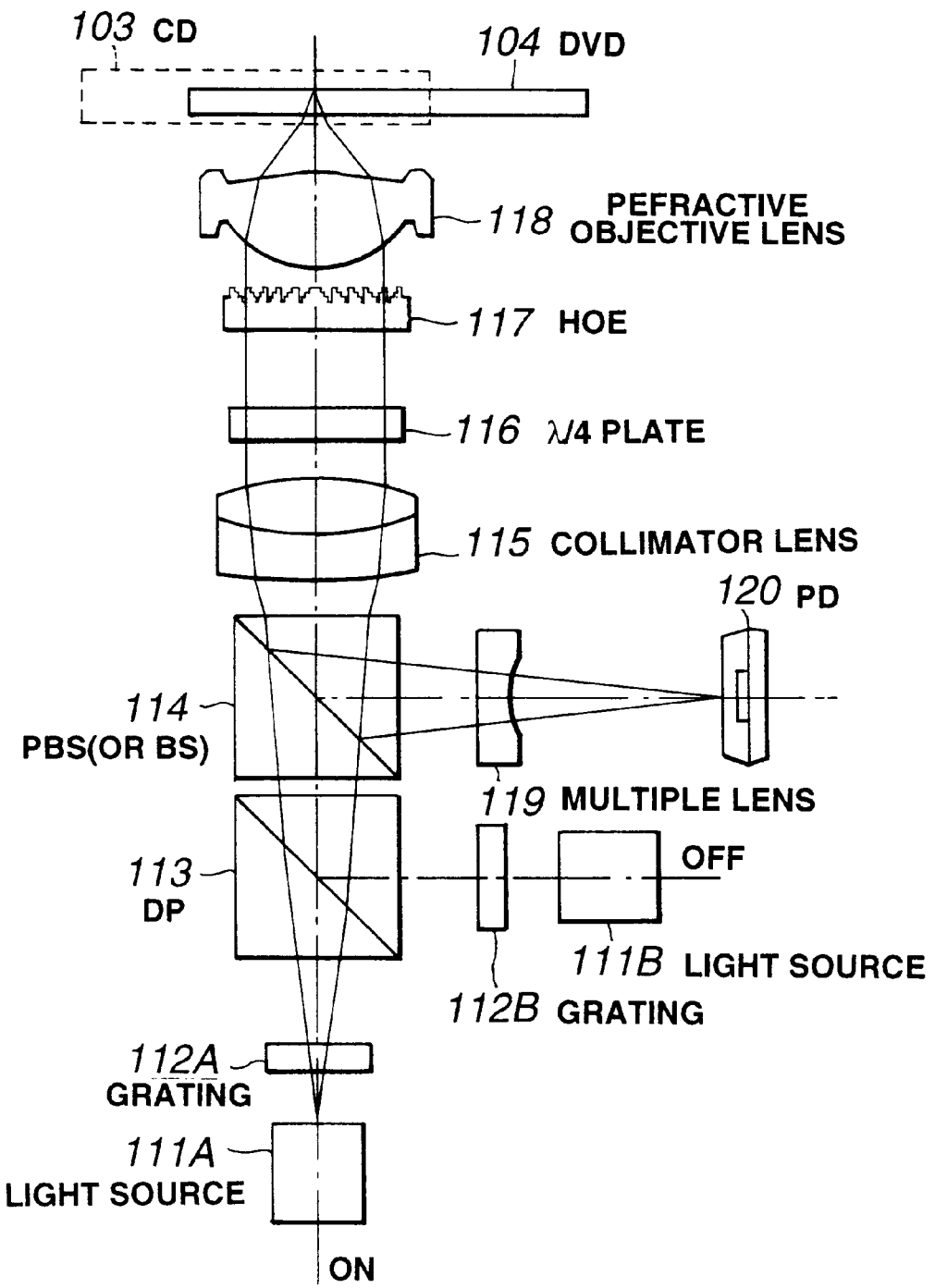
FIG. 4 is a schematic drawing of an example of the conventional optical pick-up configuration.
Figure 5:
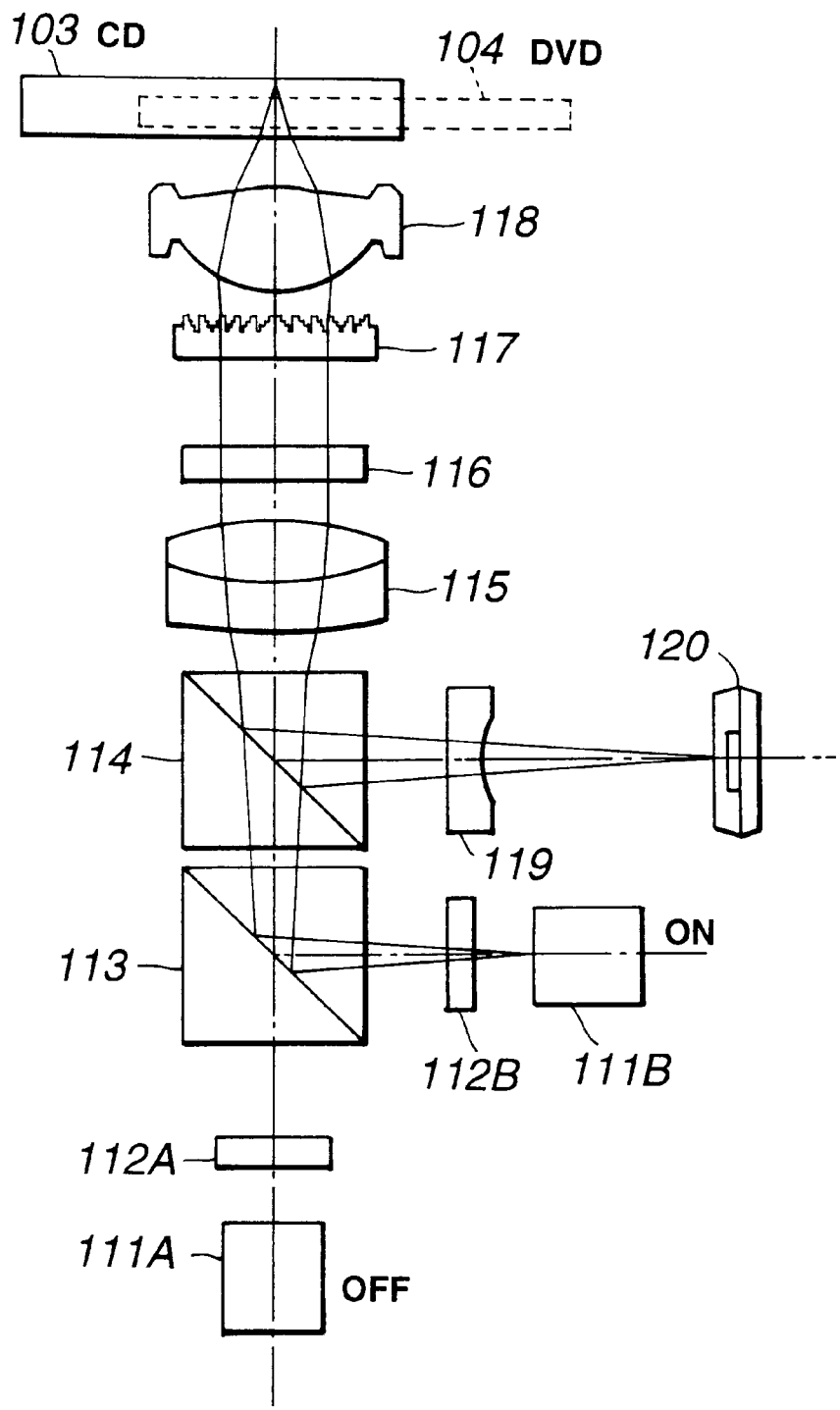
FIG. 5 is a schematic drawing of an example of another conventional optical pick-up configuration.
Figure 6:
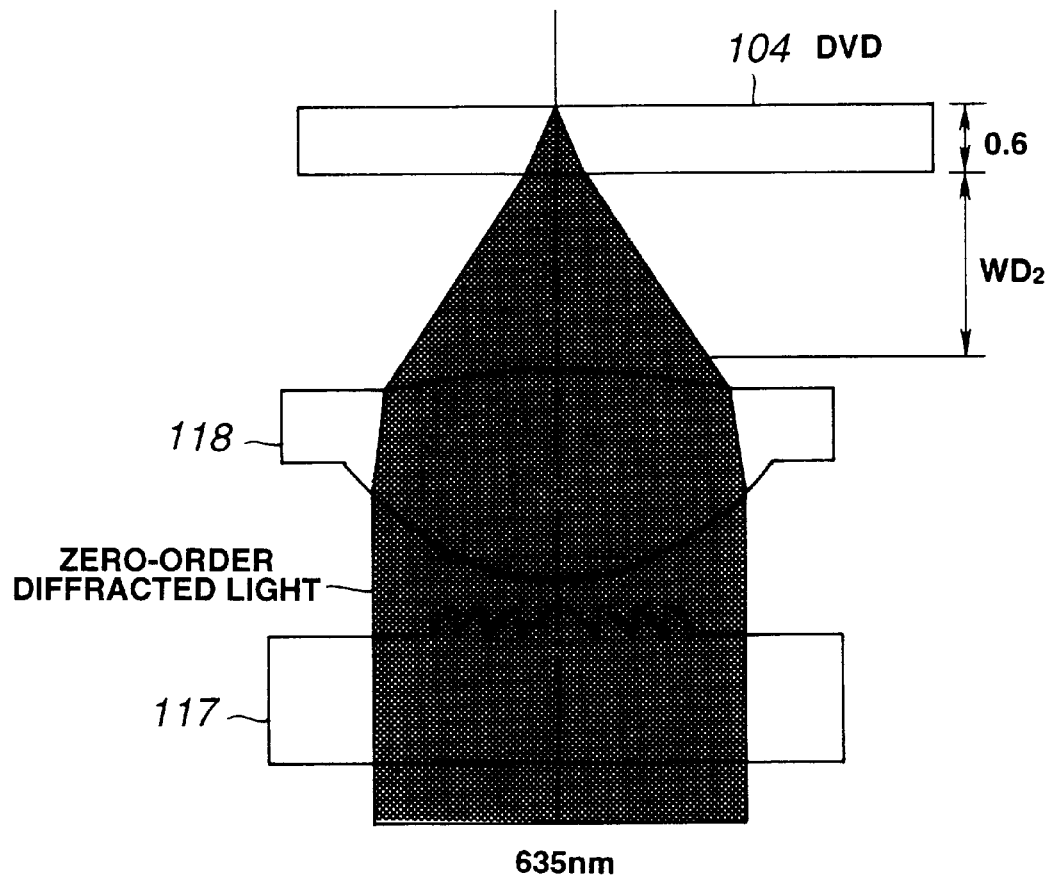
FIG. 6 illustrates the operation of the HOE 117 in FIG. 4.
Figure 7:
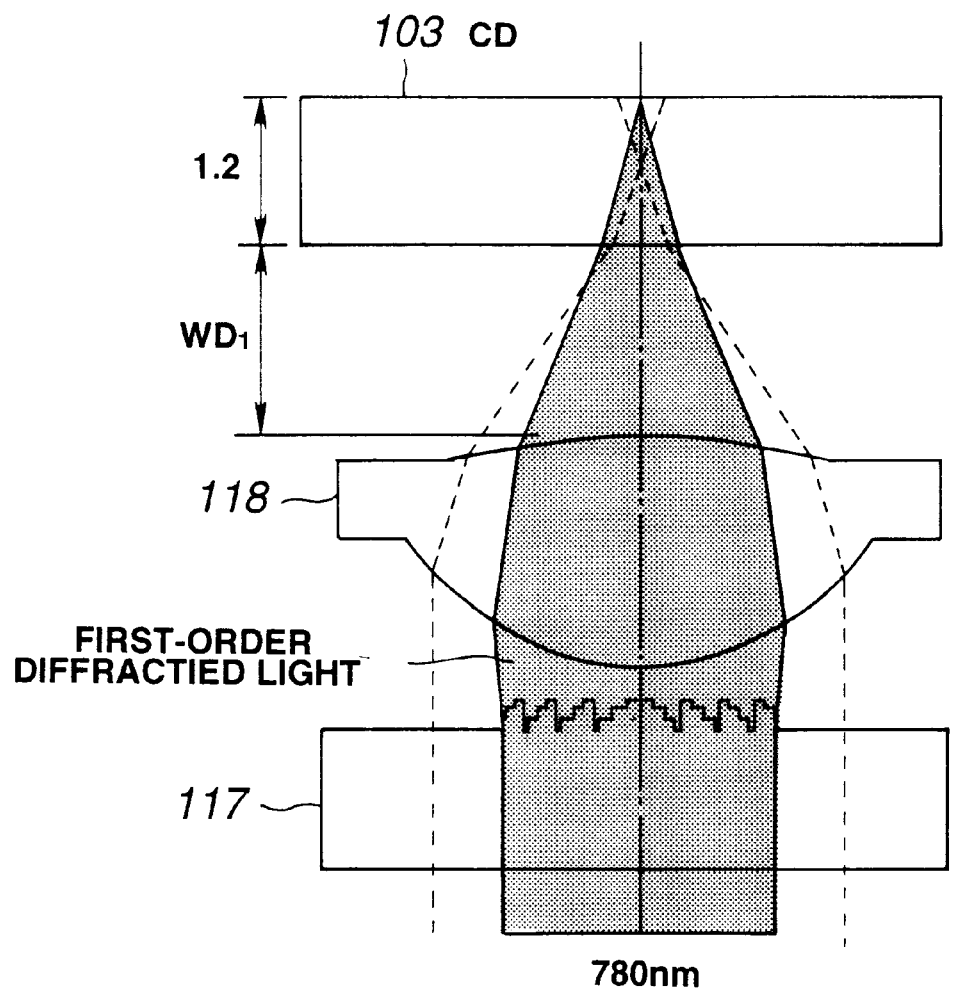
FIG. 7 illustrates the operation of the HOE 117 in FIG. 5.

As a comparison in configuration between the optics shown in FIGS. 9 and 10 and those shown in FIGS. 4 and 5 will make it clear, the dichroic prism 113 provided in the prior-art optical systems in FIGS. 4 and 5 to synthesize an optical path (division of optical axis) is not necessary for the present invention because in the present invention, the laser chip 21B is disposed on the optical axis of the refractive objective lens 26 while the laser chip 21A is disposed off that optical axis, the HOE 25 being adapted to guide a laser light from the laser chip 21A along the optical axis. Therefore, the present invention can be reduced to practice using a reduced number of parts or members. Furthermore, to dispose both the two light sources 111A ad 111B on an optical axis as shown in FIGS. 4 and 5, they should be stacked nearly vertically one on the other, which will increase the dimensions of the apparatus. On the contrary, according to the present invention, one of the two light sources is disposed off the optical axis, so that they can be disposed in closer proximity of each other in a single package, which will enable a more compact design of the apparatus.

Figure 1:
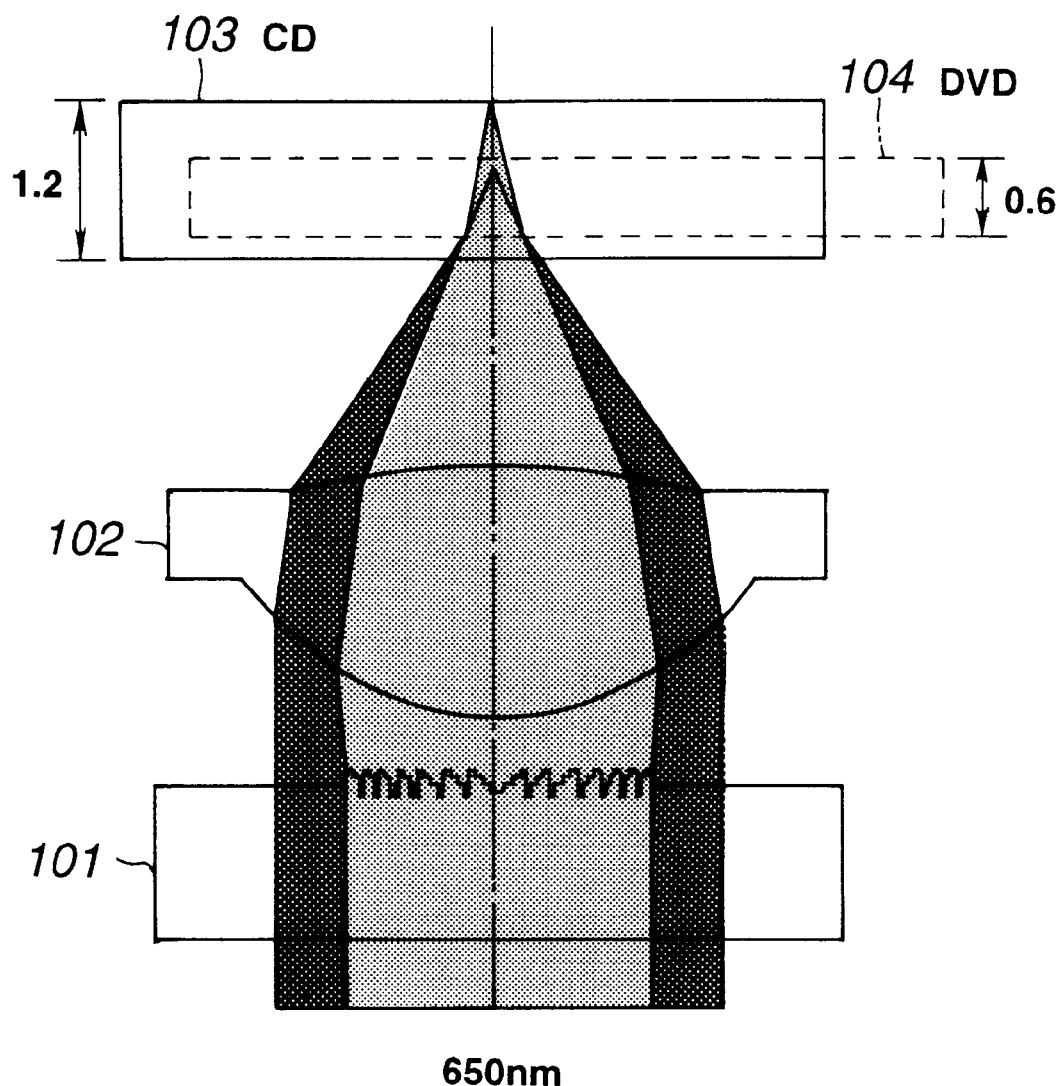
FIG. 1 is a schematic drawing of an optical path established by a conventional dual-focus holographic optical element (HOE)
Figure 2:
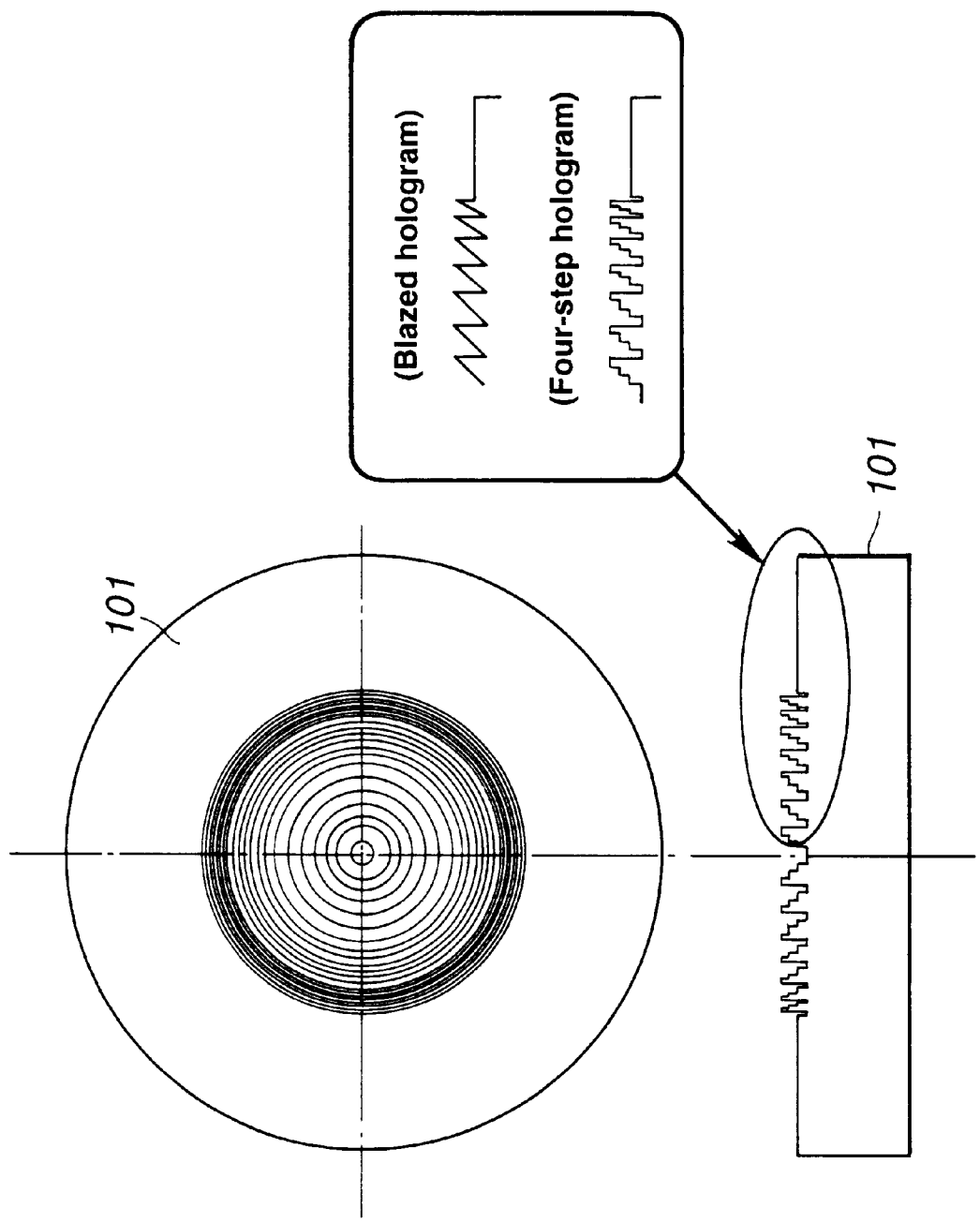
FIG. 2 consisting of FIGS. 2A through 2B is a schematic drawing showing the configuration of the HOE 101 in FIG. 1.
Figure 3:
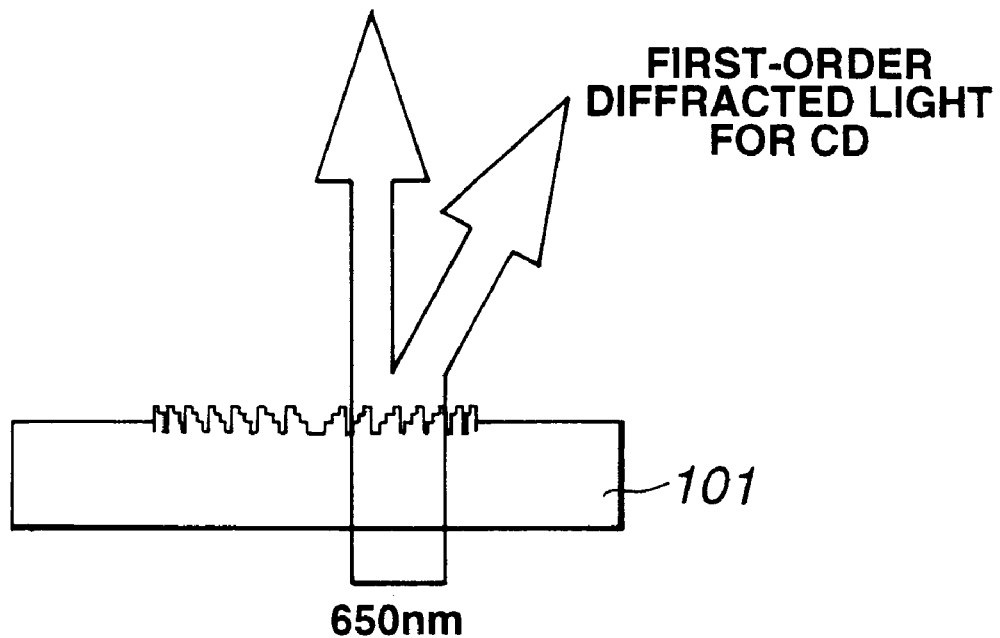
FIG. 3 shows the concept of the diffraction efficiency attainable by the HOE 101 in FIG. 1 when irradiated with an incident light.
Figure 22:
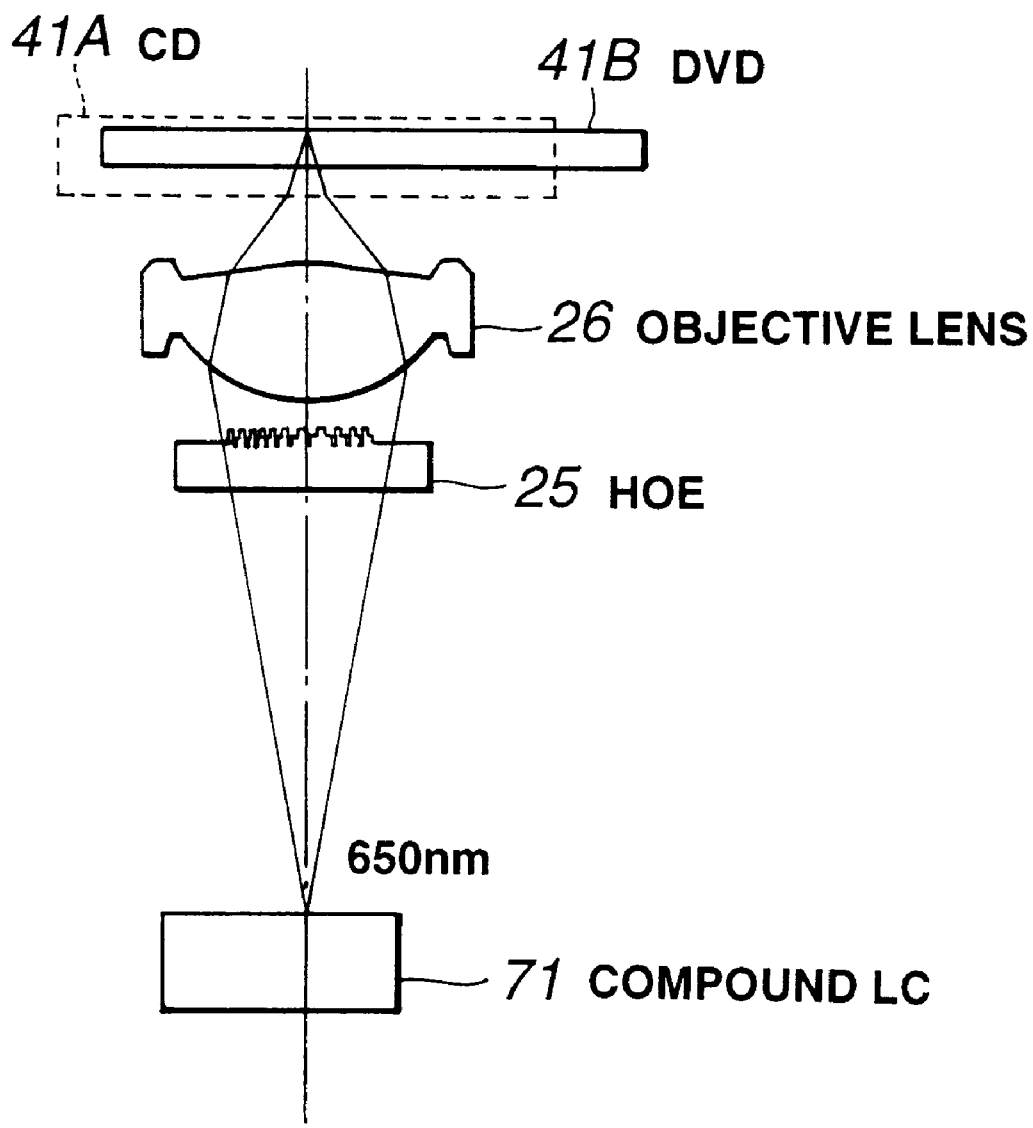
FIG. 22 shows another configuration of the optical head 1 used in the embodiment in FIG. 8.
Figure 23:
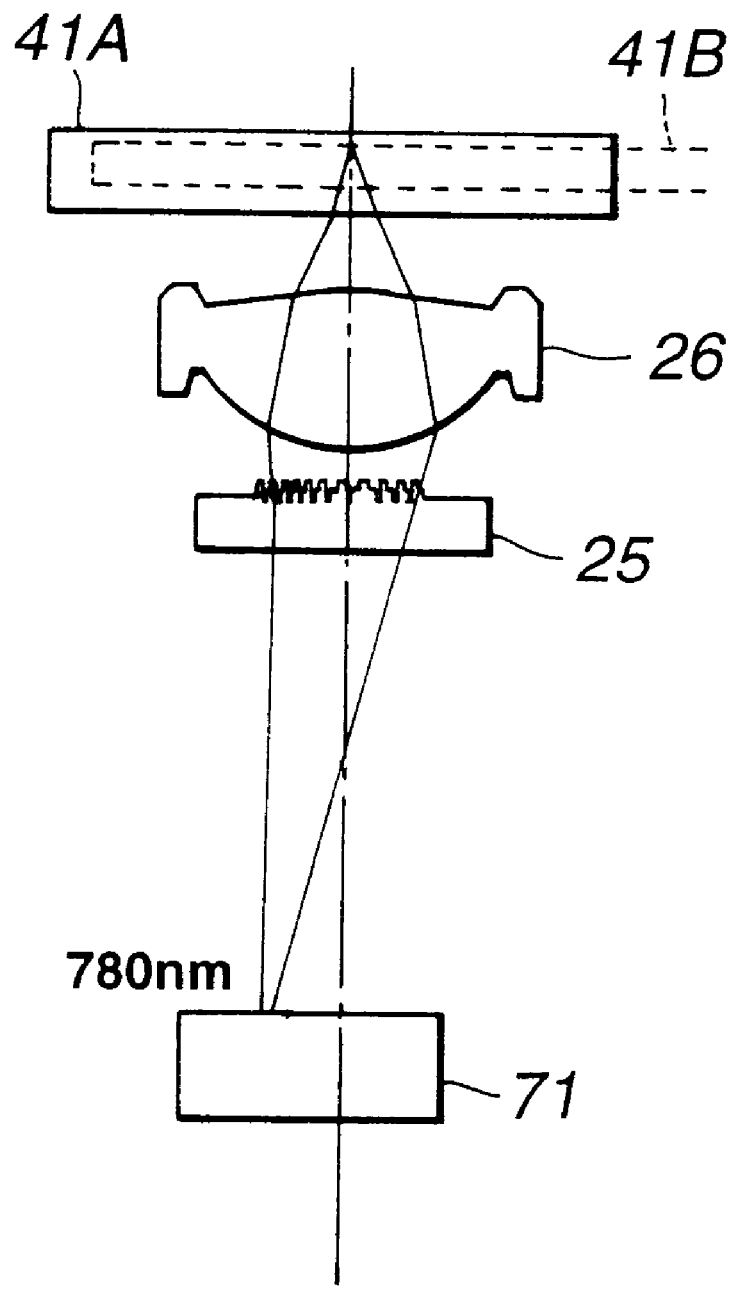
FIG. 23 shows a yet another configuration of the optical head 1 used in the embodiment in FIG. 8.

FIGS. 22 and 23 show optical heads of the apparatus according to the present invention, which are more compact than those shown in FIGS. 2 and 3. FIG. 22 shows an optical path for playback of the DVD 41B, and FIG. 23 shows an optical path for playback of the CD 41A. In these configurations of the optical heads, the grating 22A, BS 23, collimator lens 24 and multiple lens 27 shown in FIGS. 9 and 10 are omitted. Further, the laser chips 21A and 21B, and photodetector unit 28 are incorporated together in a compound laser coupler (LC) 71.

For playback of the CD 41A, a focus error signal is generated by the differential concentric circle method, and a tracking error signal is produced by the push-pull method (top-hold push-pull method). For playback of the DVD 41B, a focus error signal is produced by the differential concentric circle method as in generation of a focus error signal for playback of the CD 41A. For generation of a tracking error signal for the playback of the DVD 41B, however, the aforementioned DPD method is employed.

Figure 24:
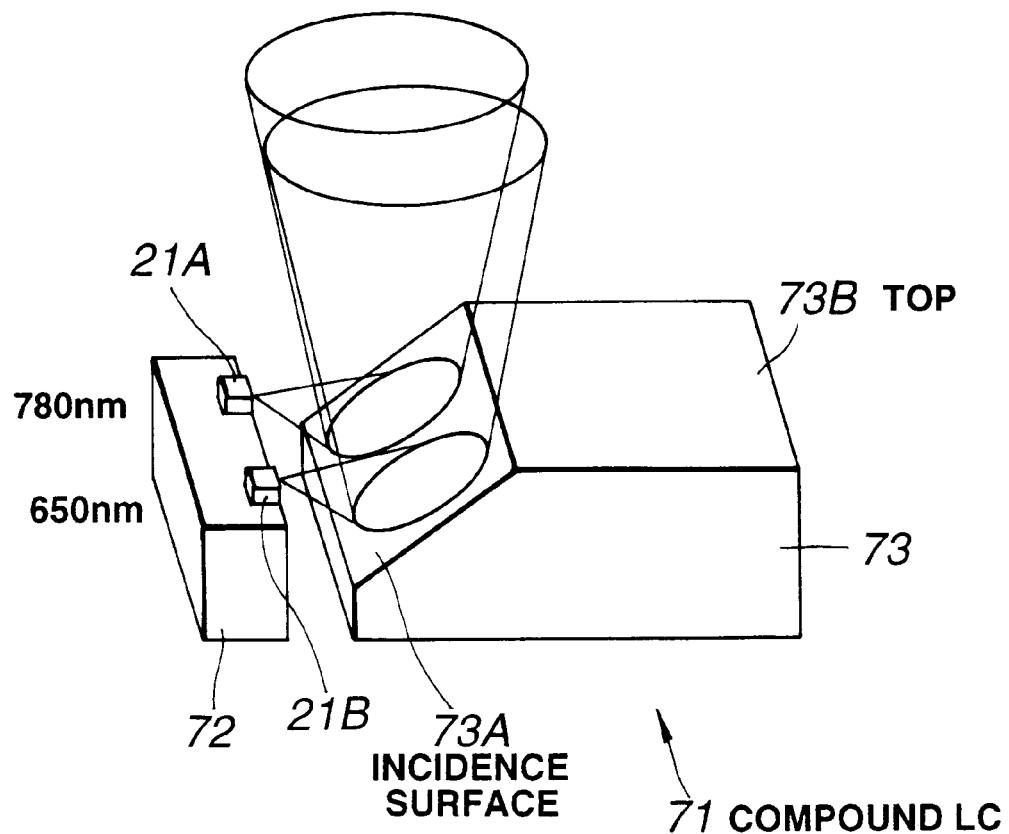
FIG. 24 is a perspective view showing the external view of the composite LC 71 in FIG. 22.
Figure 25:
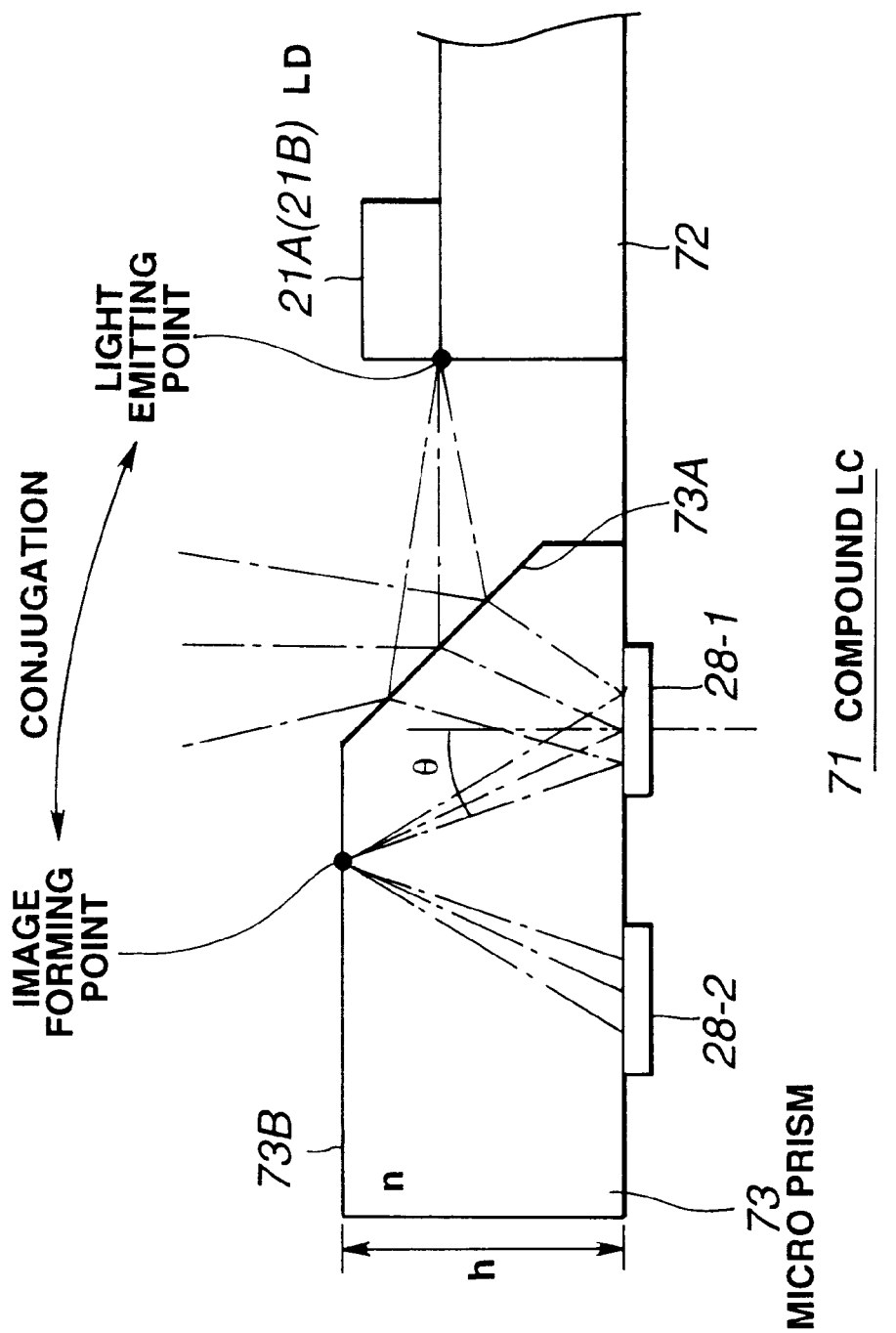
FIG. 25 is a sectional view showing the internal configuration of the composite LC 71 in FIG. 22.

FIG. 24 shows the appearance of the compound laser coupler (LC) 71, and FIG. 25 is a sectional view of the compound LC 71.

As shown, the laser chips 21A and 21B are provided as spaced a predetermined distance from each other on a base 72. Laser lights emerging from these laser chips 21A and 21B are reflected by an incidence surface 73A of a micro prism 73 and irradiated onto the CD 41A or DVD 41B through the HOE 25 and refractive objective lens 26.

The laser lights reflected by the CD 41A or DVD 41B are incident upon the micro prism 73 through the refractive objective lens 26 and HOE 25. The incident lights penetrate into the micro prism 73 from the incidence surface 73A and irradiated onto a photodetector element 28-1 disposed on the bottom of the micro prism 73. A part of the incident light is reflected by the photodetector element 28-1 and formed into an image at an image forming point at a top 73B of the micro prism 73. The image forming point has a conjugate relationship with the light emitting point of the laser chips 21A and 21B. The reflected light from the image forming point (top 73B) is incident upon another photodetector element 28-2 provided on the bottom of the micro prism 73.

Figure 26:
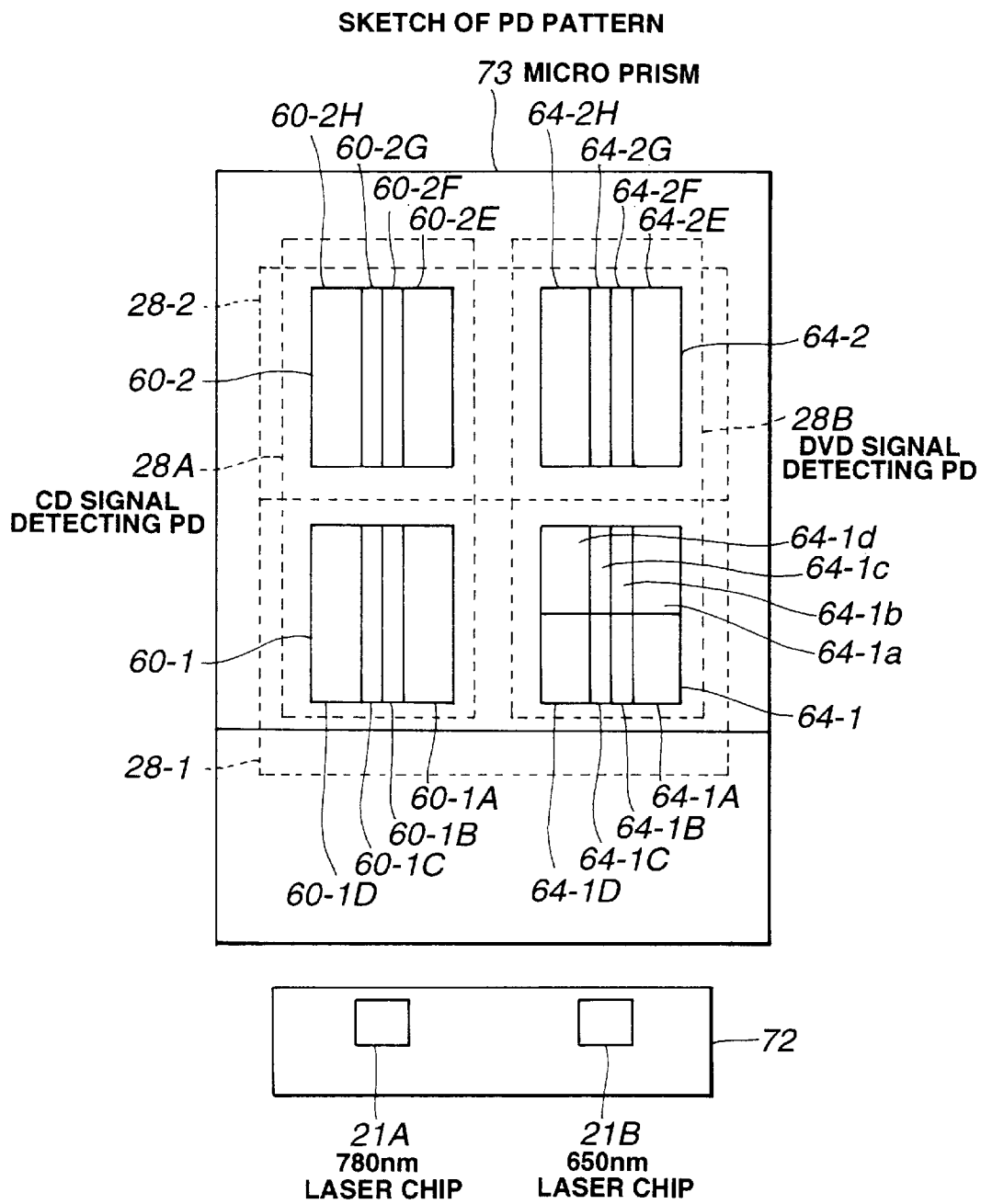
FIG. 26 shows a layout pattern of photodetector elements in the photodetector unit 28 laid in the composite LC 71 in FIG. 22.

FIG. 26 is a top plan view showing the photodetector elements 28-1 and 28-2 laid on the bottom of the micro prism 73. As shown, the photodetector part 28A for detection of CD signal consists of a photodetector element 60-1 forming the photodetector element 28-1 and a photodetector element 60-2 forming the photodetector element 28-2. The photodetector elements 60-1 and 60-2 include four photodetector elements 60-1A to 60-1D, and 60-2E to 60-2H, respectively.

The photodetector part 28B for detection of DVD signal consists of a photodetector element 64-1 forming the photodetector element 28-1 and a photodetector element 64-2 forming the photodetector element 28-2. The photodetector elements 64-1 and 64-2 include eight photodetector elements 64-1A to 64-1D and 64-1$a$ to 64-1$d$, and four 64-2E to 64-2H, respectively.

To produce a focus error signal from an output from the photodetector part 28A for detection of CD signal by the differential concentric circle method, the calculation circuit 2 computes to produce the following signals:

$F_1 = (B+C) - (A+D)$ $F_2 = (G+F) - (E-H)$ $F_3 = F_1 - F_2 = \{(B+C) - (A+D)\} - \{(G+F) - (E+H)\}$

When the laser light is focused just on a CD, the above signals $F_1$ to $F_3$ are all zero. When the light is focused near the CD, the signals $F_1$ and $F_3$ are negative while the signal $F_2$ is positive. When the light is focused far from the CD, the signals $F_1$ and $F_3$ are positive while the signal $F_2$ is negative.

A tracking error signal T is produced through calculation of the following formula based on the push-pull method:

$T = (A+B+E+F) - (C+D+G+H)$

On the other hand, for DVD playback, a focus error signal is produced as follows through a calculation based on the differential concentric circle method as in the aforementioned generation of the focus error signal for the CD playback:

$$F_1 = \{(B+b) + (C+c)\} - \{(A+a) + (D+d)\}$$
$$F_2 = (G+F) - (E+H)$$
$$F_3 = F_1 - F_2$$
$$= (\{((B+b) + (C+c)) - ((A+a) + (D+d))\} - \{(G+F) - (E+H)\}$$

For generation of a tracking error signal by the DPD method for DVD playback, the calculation circuit 2 will compute as follows:

$P = A+B$ $Q = C+D$ $R = c+d$ $S = a + b$

Further, by detecting a phase difference between (P+S)+(Q+R) and (P+S)−(Q+R), a tracking error signal is produced.

Figure 27:
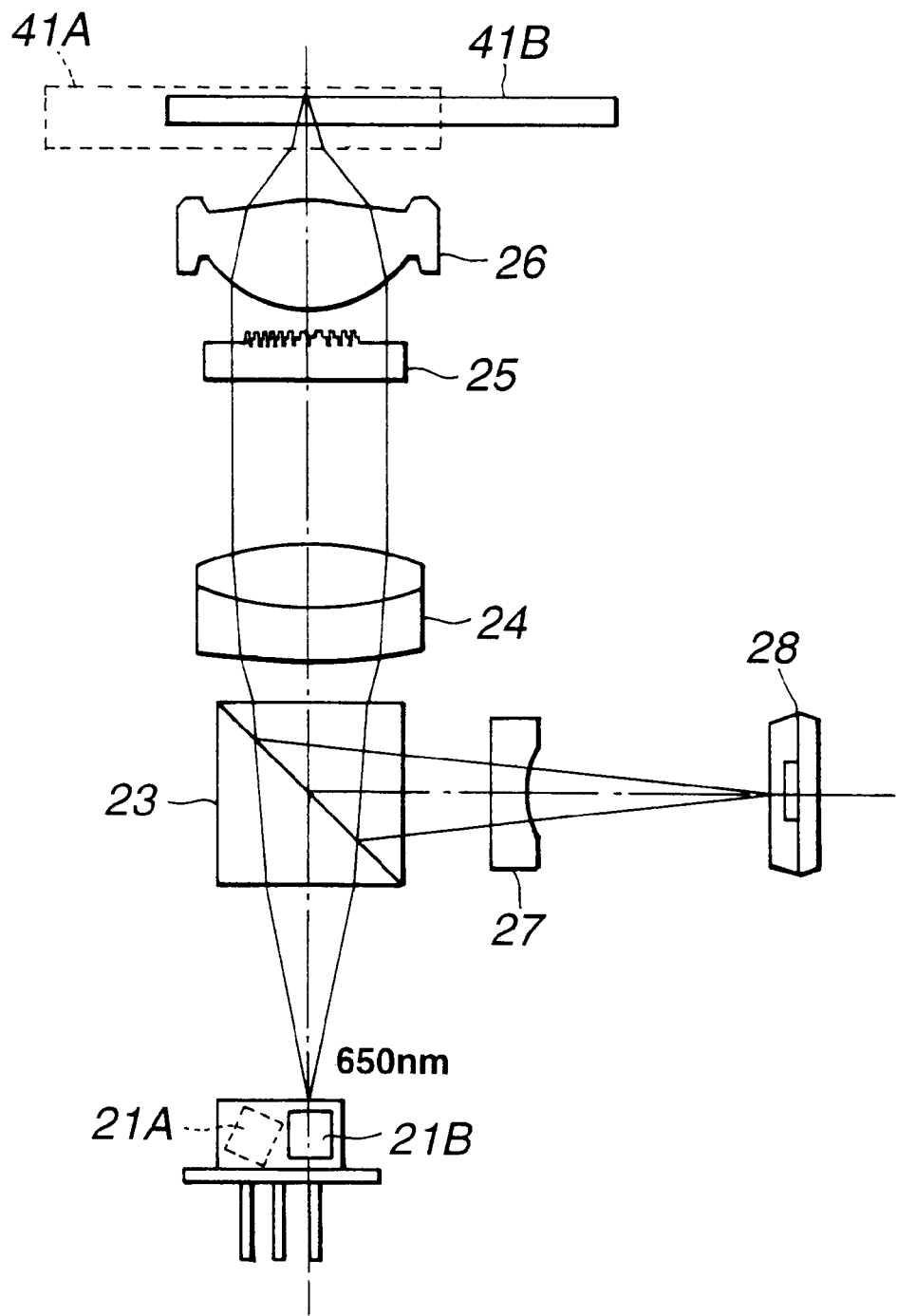
FIG. 27 shows a still another configuration of the optical head 1 used in the embodiment in FIG. 8.
Figure 28:
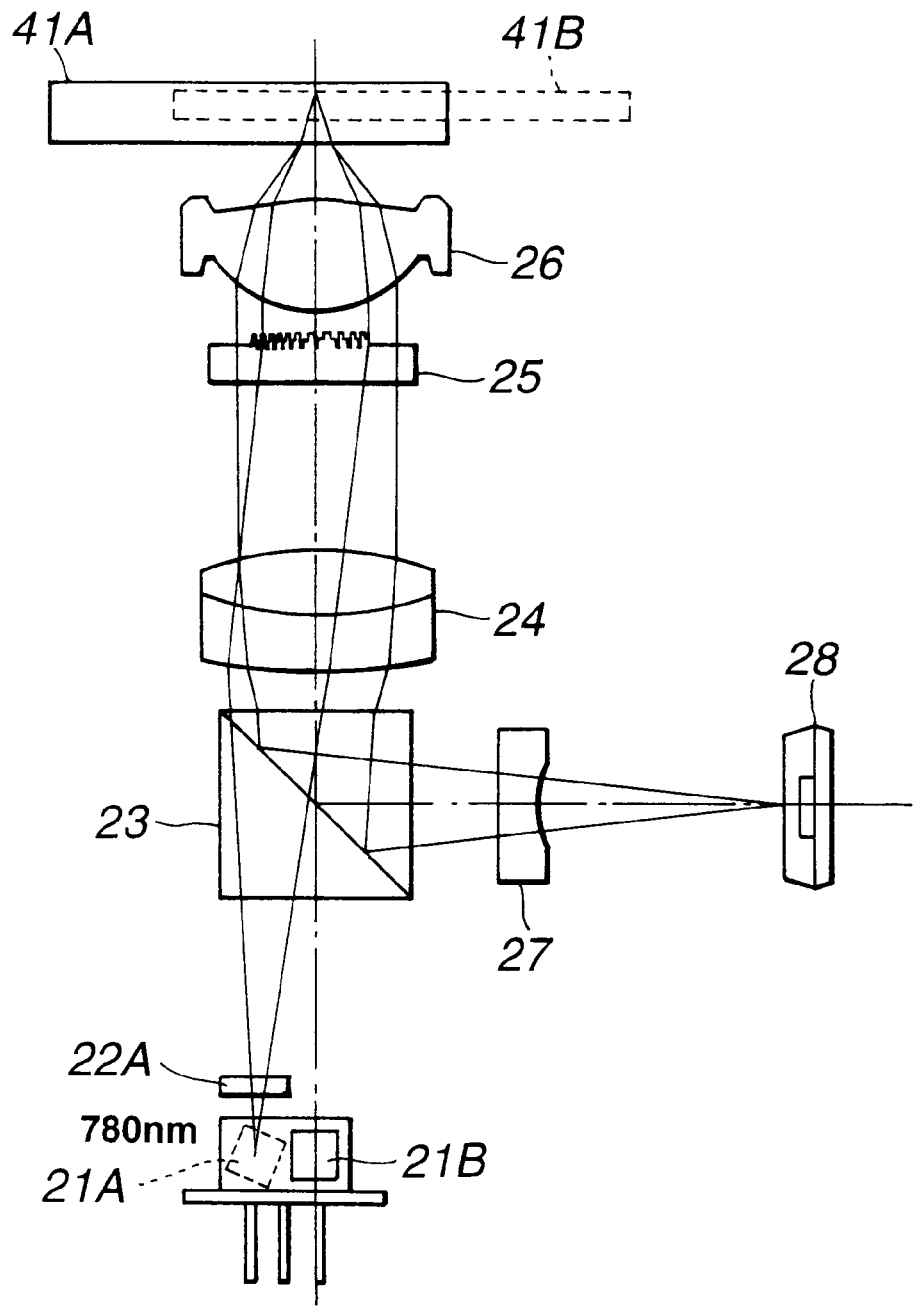
FIG. 28 shows a still yet another configuration of the optical head 1 used in the embodiment in FIG. 8.

FIGS. 27 and 28 show further configurations of the optical head 1 of the present invention. FIG. 27 shows an optical path for DVD playback, and FIG. 28 shows an optical path for CD playback. The respective basic compositions are similar to those shown in FIGS. 9 and 10 provided that the characteristic of the HOE 25 and pattern configuration of the photodetector unit 28 are different from those having previously been described with reference to FIGS. 9 and 10.

Figure 29:
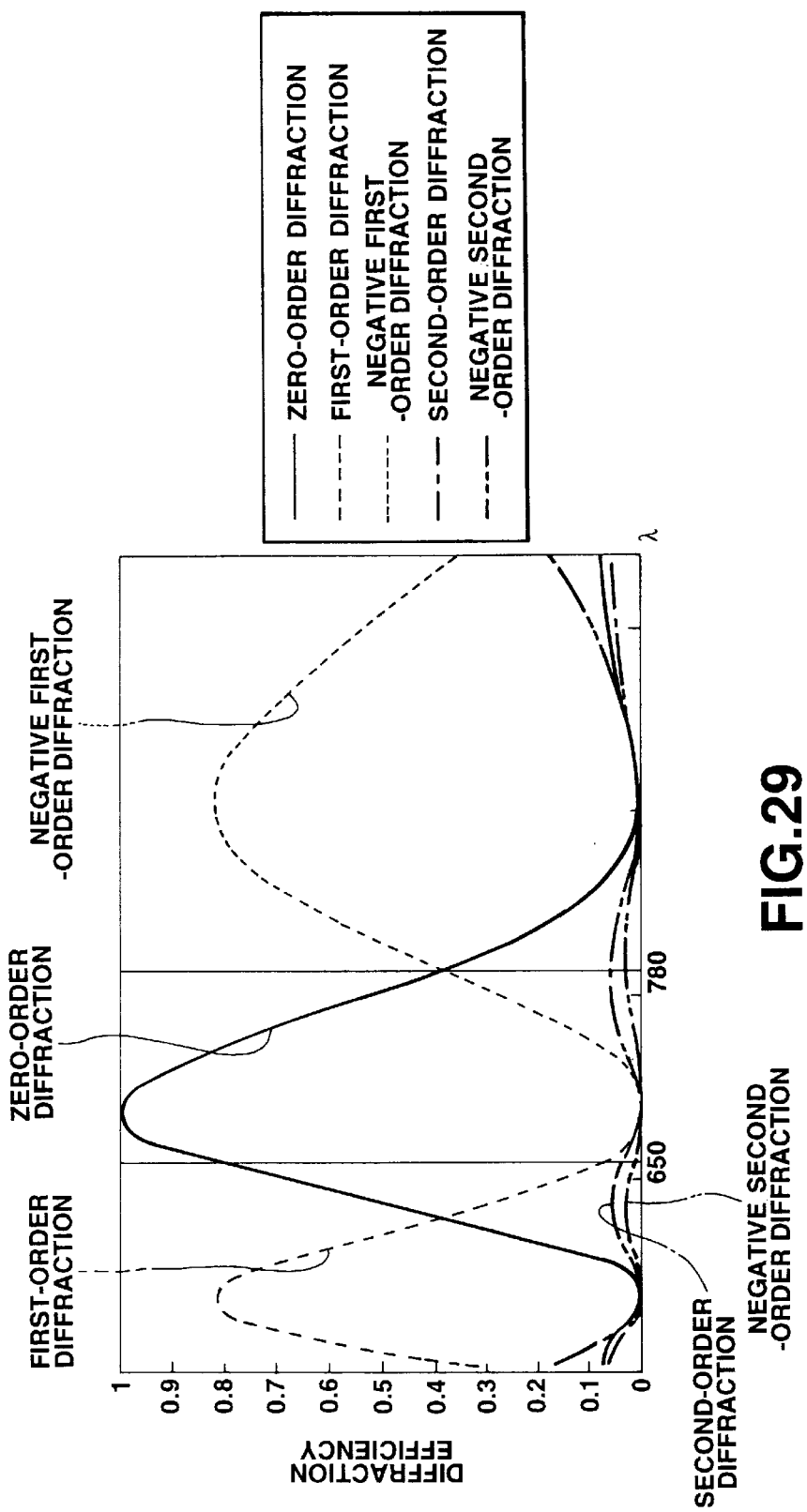
FIG. 29 shows the diffraction characteristics of the HOE 25 in FIG. 27.

FIG. 29 shows the diffraction efficiency of the HOE 25 shown in FIGS. 27 and 28. As seen, each step of each annular zone is shifted to a height somewhat higher than 650/(n−1) nm. When a laser light of 650 nm in wavelength is incident upon the HOE 25, about 87% of the incident light will be allowed to pass through the HOE 25 as a zero-order diffracted light. The optical energy of the diffracted lights of other orders is sufficiently low as compared with that of the zero-order diffracted light.

When a laser light of 780 nm in wavelength is incident upon the HOE 25, about 40% of the light is diffracted by the HOE 25 as a negative first-order diffracted light, and allowed to pass through the HOE 25 as a zero-order diffracted light. The lights of other orders retain a rather lower energy than the zero-order and negative first-order diffracted lights. For detection of the signals by a same photodetector in this case, the annular zones of the HOE 25 are optimized for the light spots on the CD and DVD to take a same optical position.

Figure 30:
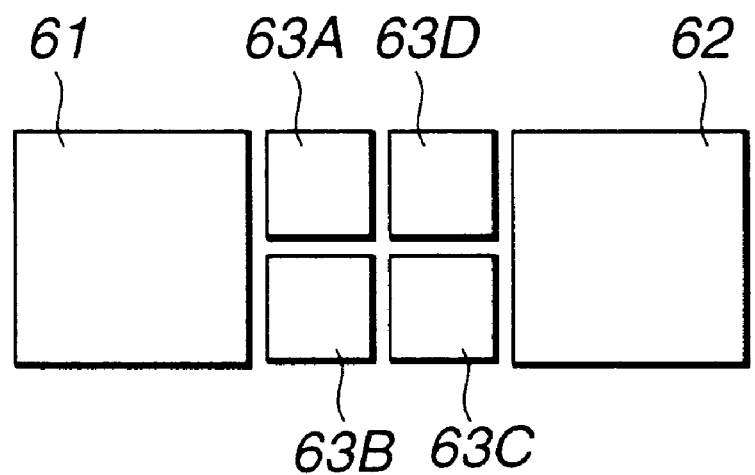
FIG. 30 shows a layout pattern of photodetector elements in the photodetector unit 28 in FIG. 27.

FIG. 30 shows a layout pattern of photodetector elements in the photodetector unit 28 shown in FIGS. 27 and 28. As shown, the photodetector unit 28 is formed to have a substantially same configuration as that of the photodetector part 28A for detection of reflected laser light from a CD shown in FIG. 11. The photodetector unit 28 is adapted to detect a laser light from a CD and a DVD as well.

As shown in FIG. 27, when a light of 650 nm in wavelength emerged from the laser chip 21B is incident upon the HOE 25 for playback of the DVD 41B, about 87% of the incoming light is diffracted by the HOE 25 as a zero-order diffracted light, and incident upon the DVD 41B through the refractive objective lens 26. The laser light reflected at the DVD 41B is converged by the refractive objective lens 26 and incident again onto the HOE 25. Also in this case, about 87% of the incident light is allowed to go out as a zero-order diffracted light. In effect, about 76% of the initial laser light emerged from the laser chip 21B can be used for DVD playback.

The outgoing laser light emerged from the HOE 25 is incident upon the photodetector element 63 of the photodetector unit 28 through the collimator lens 24, BS 23 and multiple lens 27. The calculation circuit 2 carries out the astigmatism to produce a focus error signal from outputs from the photodetector quadrants 63A to 63C, and the DPD method to produce a tracking error signal.

Figure 31:
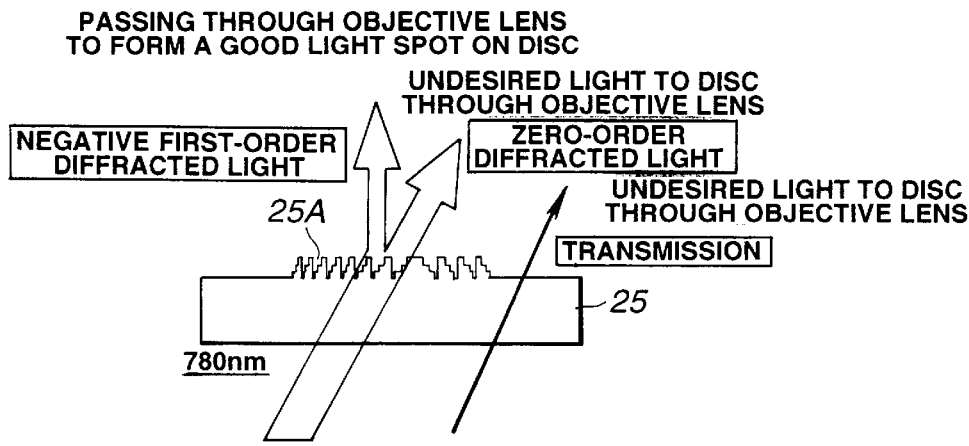
FIG. 31 shows the operation of the HOE 25 in FIG. 28 when irradiated with a laser light having bypassed the optical axis.

On the other hand, when a laser light of 780 nm in wavelength emerged from the laser chip 21A for playback of the CD 41A is divided into substantially three beams by the grating 22A, and the laser beams are incident upon the HOE 25 through the BS 23 and collimator lens 24, as shown in FIG. 28. As shown in FIG. 31, the HOE 25 allows 40% of the incident laser light having bypassed the optical axis to go out as a negative first-order diffracted light along the optical axis and other 40% of the incident laser light to go out as a zero-order diffracted light along an optical path off the optical axis. Since the HOE 25 is optimized to cancel a coma aberration, astigmatic aberration and a spherical aberration caused by a difference in thickness from one substrate to another in a disc, the negative first-order diffracted light will define an aberration-free good light spot on the CD 41A through the refractive objective lens 26. It should be noted that such light spot takes a predetermined position having a conjugate relationship with the light emitting point of the laser chip 21B for the DVD.

Figure 32:
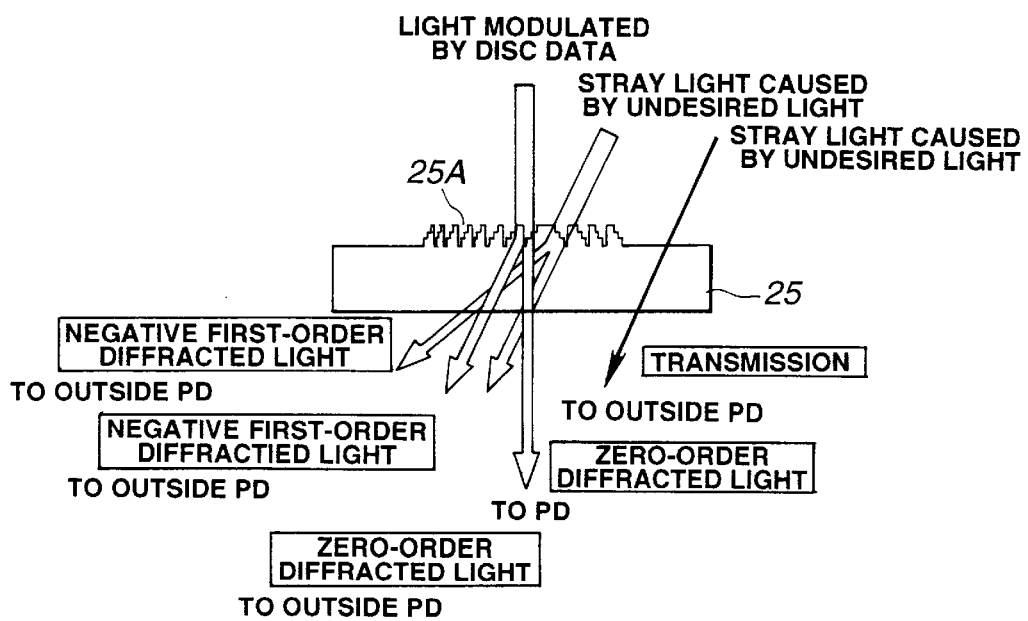
FIG. 32 shows the operation of the HOE 25 in FIG. 28 when irradiated with a reflected light from a disc.

The negative first-order diffracted light leave the HOE 25 is incident upon the CD 41A through the refractive objective lens 26, and modulated by data recorded on the disc. The light thus modulated is reflected back from the CD 41A and converged by the refractive objective lens 26 and incident again upon the HOE 25. As shown in FIG. 32, 40% of the incoming light is allowed by the HOE 25 to go out as a negative first-order light onto an optical path off the optical axis and other 40% of the incident laser light is let to go out as a zero-order diffracted light along the optical axis. The zero-order diffracted light is incident upon the photodetector unit 28 through the collimator lens 24, BS 23 and multiple lens 27. In this case, since the laser light has been divided in substantially three beams by the grating 22A, the return lights will be detected by the photodetector elements 61 to 63. The calculation circuit 2 performs the astigmatism to produce a focus error signal, while carrying out the three-beam method to produce a tracking error signal.

In this embodiment, the energy of a light passed through the HOE 25 and available for data readback is about 16% (=0.4×0.4×100%) of that retained by the incoming light to the CD 41A.

As shown in FIG. 31, 40% of the incident laser light having traveled along an optical path off the optical axis is allowed light to pass through the HOE 25 as a zero-order diffracted light. Some off-axial lights propagate through areas of the HOE 25 outside the diffraction zone (phase modulator) 25A of the HOE 25. All these lights will be undesired ones, but a portion thereof is reflected by the CD 41A and incident again onto the HOE 25 as shown in FIG. 32. The light having once passed forward through the HOE 25 and reflected back from the CD 41A is thus incident again upon the HOE 25. Forty 40 percents of the return light is allowed to pass through the HOE 25 as a zero-order diffracted light and other 40% (40% of the outgoing light) is let to go out of the HOE 25 as a negative first-order diffracted light. However, since all these components of the incoming light have traveled on optical paths off the optical axis, they will not be incident upon the photodetector unit 28. Also, the light components reflected from the CD and passing through some other peripheral areas outside the diffraction zone (phase modulator) 25A of the HOE 25 will not be incident upon the photodetector unit 28. Thus, the servo signals will not possibly be adversely affected by such light components.

Owing to the above-mentioned configurations of the optical heads, the optical energy of the laser light will be less attenuated and less stray light will take place than in the optical heads having the configurations shown in FIGS. 9 and 10. Also, the photodetector layout pattern can be rather simplified, leading to a more compact design of the apparatus.

Figure 33:
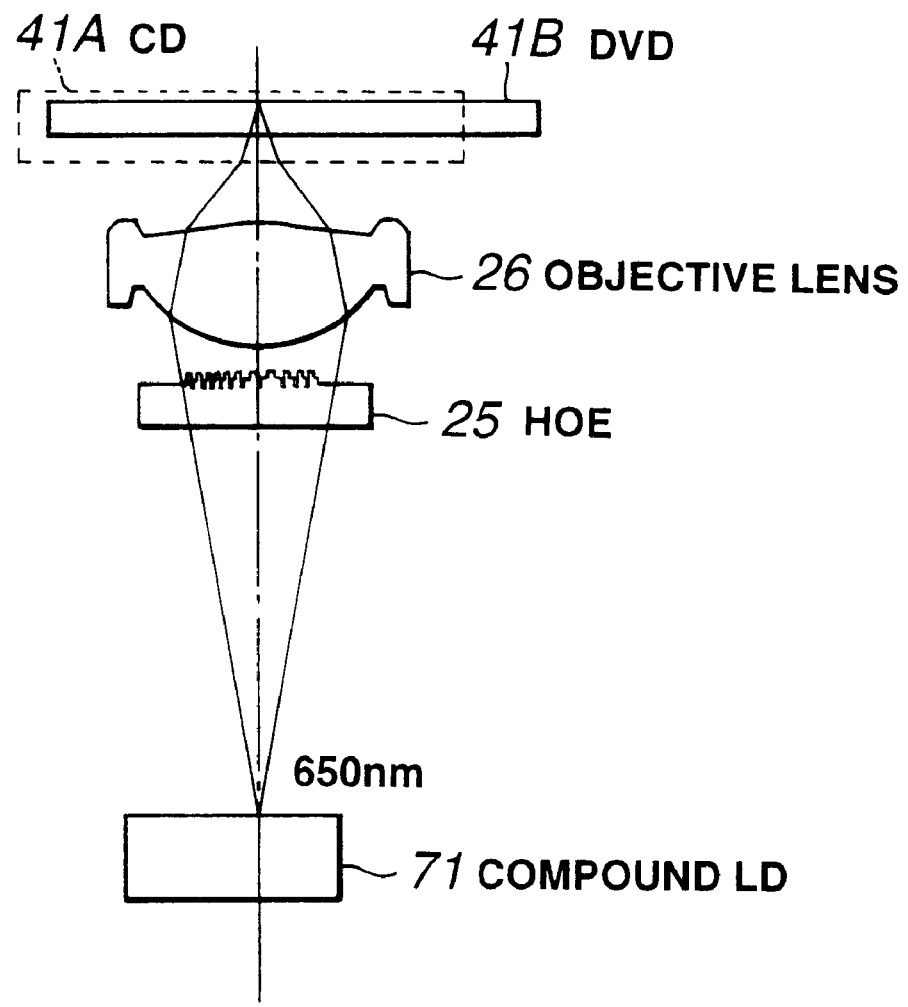
FIG. 33 shows another example of the configuration of the optical head 1 used in the embodiment in FIG. 8.
Figure 34:
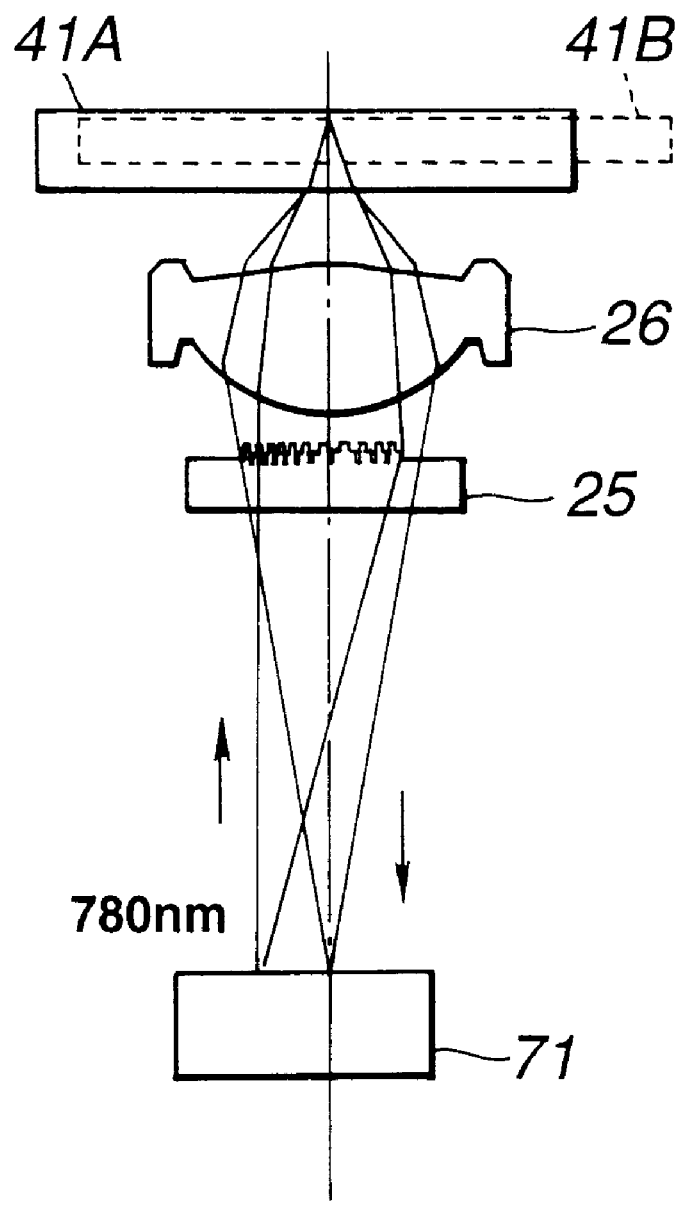
FIG. 34 shows a still another example of the configuration of the optical head 1 used in the embodiment in FIG. 8.

FIGS. 33 and 34 show configurations of optical heads which are more simplified than those shown in FIGS. 27 and 28. FIG. 33 shows an optical path for DVD playback, and FIG. 34 shows an optical path for CD playback. Also, in these optical head configurations, the BS 23, collimator lens 24 and multiple lens 27 are omitted which are shown in FIGS. 27 and 28, and the laser chips 21A and 21B, and photodetector unit 28 are housed as a compound LC 71 in a single package.

Figure 35:
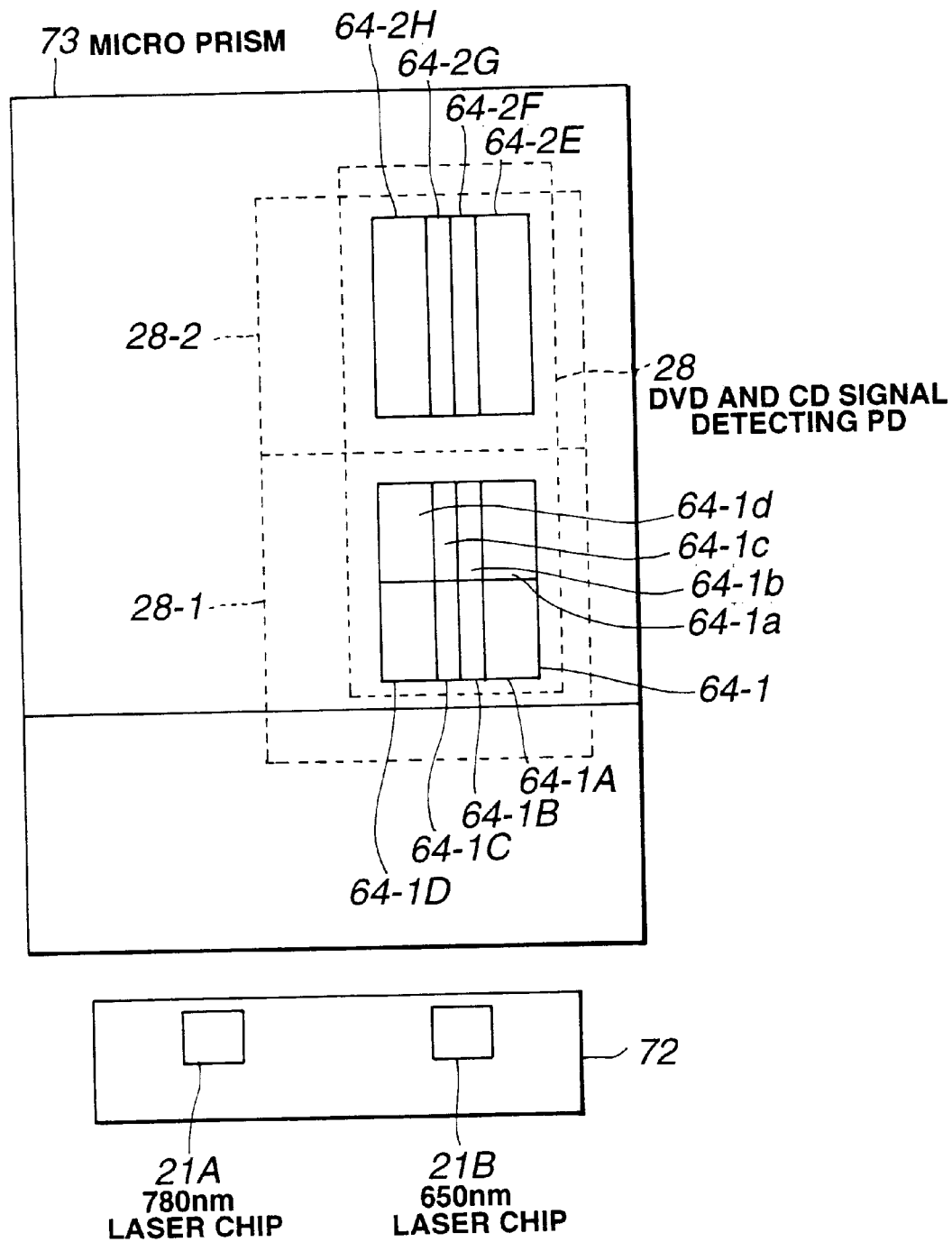
FIG. 35 shows a layout pattern of photodetector elements in the composite LC 71.

FIG. 35 shows a layout pattern of photodetector elements in the photodetector unit 28 incorporated in the compound LC 71. This pattern is substantially same as that of the photodetector part 28B for DVD signal detection shown in FIG. 26 provided that the pattern shown in FIG. 35 is adapted to detect a laser light for DVD playback and a laser light for CD playback as well. The calculation circuit 2 effects the differential concentric circle method to produce a focus error signal for both CD playback and DVD playback. However, the calculation circuit 2 produces a tracking error signal for CD playback through a calculation by the push-pull method and for DVD playback through a calculation by the DPD method.

Owing to this configuration, the photodetector part 28A for detection of CD signal used as in FIG. 26 is not required for the optical head, and the optical head itself can be designed more compact.

It should be noted that the present invention is not only applicable for data read but also for data write.

What is claimed is:

1. An apparatus for recording and/or reproducing data into and/or from a first recording medium into or from which data is recorded or reproduced using a light of a first wavelength, and a second recording medium, into or from which data is recorded or reproduced using a light of a second wavelength, comprising:

a means for focusing a light of a first or second wavelength onto a first or second recording media;

a first means disposed off the optical axis of the focusing means for generating a light of the first wavelength;

a second means disposed on the optical axis of the focusing means for generating a light of the second wavelength;

a means of correcting a coma aberration in the light of the first wavelength and guiding the corrected light along the optical axis of the focusing means;

a means of detecting the light of the first or second wavelength reflected from the first or second recording media, and means for incorporating the first and second light generating means in a single package.

2. The apparatus according to claim 1, wherein the first and second recording media have substrates different in thickness from each other, the correcting means being designed to correct a spherical aberration of a light having the first wavelength.

3. The apparatus according to claim 1, wherein the correcting means is a holographic optical element.

4. The apparatus according to claim 3, wherein the correcting means comprises a phase modulating means having a blazed hologram including annular zones formed thereon concentrically with each other but eccentrically with respect to the center of the phase modulating means, each annular zone having three or more steps each having a height which will impart a phase difference to a light of the first wavelength but no substantial phase difference to a light of the second wavelength.

5. The apparatus according to claim 4, wherein the correcting means is designed to just or approximately meet the following requirement:

$$d = p\lambda 2/(n-1)$$

where d is the height of each of the steps, n is the refractive index of the substrate of the holographic optical element, p is a positive integer and $\lambda 2$ is the second wavelength.

6. The apparatus according to claim 5, wherein in the correcting means, the number N of the steps of each annular zone and height d of each step are set so that a positive or negative first-order diffraction efficiency of a light having the first wavelength is sufficiently greater than diffraction efficiencies of the other orders.

7. The apparatus according to claim 5, wherein in the correcting means, the number N of the steps of each annular zone and height d of each step are set so that a zero-order diffraction efficiency of a light having the first wavelength is approximate to a positive or negative first-order diffraction efficiency of a light having the first wavelength.

8. The apparatus according to claim 4, wherein in the correcting means, the phase modulating means is formed in a range smaller than the effective radius of the focusing means.

9. The apparatus according to claim 4, wherein the photodetector means is designed to detect a zero-order diffracted component having the first wavelength or the second wavelength and passing through the correcting means.

10. The apparatus according to claim 9, wherein the correcting means is optimized so that the optical position of a light spot formed on a data recording layer of the second recording medium having the second thickness through focusing of a light having the second wavelength by the focusing means coincides with an optical spot formed on a recording layer of the first recording medium having the first thickness through focusing of a light having the first wavelength by the focusing means.

11. The apparatus according to claim 1, wherein the photodetector means is further incorporated in the single package.

12. A method for recording and/or reproducing data into and/or from a first recording medium into or from which data is recorded or reproduced using a light of a first wavelength, and a second recording medium into or from which data is recorded or reproduced using a light of a second wavelength, by focusing the light of the first or second wavelength onto the first or second recording medium by a focusing means, comprising the steps of:

disposing off the optical axis of the focusing means a first means for generating a light of the first wavelength;

disposing on the optical axis of the focusing means a second means for generating a light of the second wavelength;

correcting a coma aberration in the light of the first wavelength and guiding the corrected light along the optical axis of the focusing means;

detecting the light of the first or second wavelength reflected from the first or second recording media; and incorporating the first and the second light generating means in a single package.

13. An optical head for recording and/or reproducing data into and/or from a first recording medium into or from which data is recorded or reproduced using a light of a first wavelength and a second recording medium into or from which data is recorded or reproduced using a light of a second wavelength, comprising:

a means of focusing a light of a first or second wavelength onto a first or second recording media;

a first means disposed off the optical axis of the focusing means to generate a light of the first wavelength;

a second means disposed on the optical axis of the focusing means to generate a light of the second wavelength;

a means of correcting a coma aberration in the light of the first wavelength and guiding the corrected light along the optical axis of the focusing means;

and a means of detecting the light of the first or second wavelength reflected from the first or second recording media; and means for incorporating the first and second light generating means in a single package.

14. The optical head according to claim 13, wherein the first and second recording media have substrates different in thickness from each other, the correcting means being designed to correct a spherical aberration of a light having the first wavelength.

15. The optical head according to claim 14, wherein the correcting means is a holographic optical element.

16. The optical head according to claim 15, wherein the correcting means comprises a phase modulating means having a blazed hologram including annular zones formed thereon concentrically with each other but eccentrically with respect to the center of the phase modulating means, each annular zone having three or more steps each having a height which will impart a phase difference to a light of the first wavelength but no substantial phase difference to a light of the second wavelength.

17. The optical head according to claim 16, wherein the correcting means is designed to just or approximately meet the following requirement:

$$d = p\lambda 2/(n-1)$$

where d is the height of each of the steps, n is the refractive index of the substrate of the holographic optical element, p is a positive integer and $\lambda 2$ is the second wavelength.

18. The optical head according to claim 17, wherein in the correcting means, the number N of the steps of each annular zone and height d of each step are set so that a positive or negative first-order diffraction efficiency of a light having the first wavelength is sufficiently greater than diffraction efficiencies of the other orders.

19. The optical head according to claim 18, wherein in the correcting means, the number N of the steps of each annular zone and height d of each step are set so that a zero-order diffraction efficiency of a light having the first wavelength is approximate to a positive or negative first-order diffraction efficiency of a light having the first wavelength.

20. The optical head according to claim 17, wherein in the correcting means, the phase modulating means is formed in a range smaller than the effective radius of the focusing means.

21. The optical head according to claim 17, wherein the photodetector means is designed to detect a zero-order diffracted component having the first wavelength or the second wavelength and passing through the correcting means.

22. The optical head according to claim 21, wherein the correcting means is optimized so that the optical position of a light spot formed on a data recording layer of the second recording medium having the second thickness through focusing of a light having the second wavelength by the focusing means coincides with an optical spot formed on a recording layer of the first recording medium having the first thickness through focusing of a light having the first wavelength by the focusing means.

23. The optical head according to claim 13, wherein the photodetector means is further incorporated in the single package.

* * * * *